US012304203B2

(12) United States Patent
Sato et al.

(10) Patent No.: US 12,304,203 B2
(45) Date of Patent: May 20, 2025

(54) INKJET HEAD, AND METHOD FOR PRODUCING INKJET HEAD

(71) Applicant: Konica Minolta, Inc., Tokyo (JP)

(72) Inventors: Yohei Sato, Hachioji (JP); Akihisa Shimomura, Atsugi (JP); Yoshinori Yoshida, Hino (JP); Hiroaki Kozai, Kodaira (JP)

(73) Assignee: KONICA MINOLTA, INC., Tokyo (JP)

( * ) Notice: Subject to any disclaimer, the term of this patent is extended or adjusted under 35 U.S.C. 154(b) by 92 days.

(21) Appl. No.: 18/044,204

(22) PCT Filed: Sep. 10, 2020

(86) PCT No.: PCT/JP2020/034317
§ 371 (c)(1),
(2) Date: Mar. 6, 2023

(87) PCT Pub. No.: WO2022/054204
PCT Pub. Date: Mar. 17, 2022

(65) Prior Publication Data

US 2023/0321978 A1 Oct. 12, 2023

(51) Int. Cl.
*B41J 2/14* (2006.01)
*B41J 2/16* (2006.01)

(52) U.S. Cl.
CPC ......... *B41J 2/14024* (2013.01); *B41J 2/1606* (2013.01)

(58) Field of Classification Search
CPC .... B41J 2/1606; B41J 2/1609; B41J 2/14024; B41J 2/14209; B41J 2002/14362; B41J 2002/14459; B41J 2202/12; B41J 2202/19; B41J 2202/20; B41J 2/01; B41J 2/135; B41J 2/02; B41J 2/1623; B41J 2/1628; B41J 2/1629; B41J 2/1631; B41J 2/1642; B41J 2/1645; B41J 2/1646; B41J 2/14; B41J 2/14008; B41J 2/14016; B41J 2/14201; B41J 2/14314
See application file for complete search history.

(56) References Cited

FOREIGN PATENT DOCUMENTS

| | | | |
|---|---|---|---|
| EP | 1065059 | A2 | 1/2001 |
| JP | 5361466 | B2 | 12/2013 |
| JP | 2014-088011 | A | 5/2014 |
| JP | 2015-039774 | A | 3/2015 |
| JP | 2019-214167 | A | 12/2019 |

(Continued)

OTHER PUBLICATIONS

International Search Report for the corresponding patent application No. PCT/JP2020/034317 dated Nov. 24, 2020, with English translation.

(Continued)

*Primary Examiner* — Kristal Feggins
(74) *Attorney, Agent, or Firm* — LUCAS & MERCANTI, LLP

(57) ABSTRACT

An inkjet head includes a first and a second channel substrates. At least one of the first and the second channel substrates is formed of silicon. A bonding interface of the first and the second channel substrates is bonded via an adhesive layer. A protective film containing a compound having a Si—C bond is formed on: an ink channel surface formed of silicon among the first and the second channel substrates; and a surface of the channel substrate side formed of silicon in the adhesive layer.

6 Claims, 18 Drawing Sheets

(56) References Cited

FOREIGN PATENT DOCUMENTS

WO 2020/144850 A1 7/2020

OTHER PUBLICATIONS

Extended European Search Report dated Jun. 9, 2023, for the corresponding patent application No. 20953269.6.
International Preliminary Report on Patentability dated Nov. 24, 2020, for the corresponding patent application No. PCT/JP2020/034317, with English translation.
Notice of Reasons for Refusal ("Communication") dated Oct. 15, 2024, issued for the corresponding Japanese Patent Application No. 2022-548321, 6 pages, with English translation.
Office Action dated Oct. 29, 2024, which was issued for the corresponding European Patent Application No. EP 20953269.6, 6 pages.
Office Action, issued on Mar. 14, 2025, for the corresponding Chinese patent application No. CN 202080103850.8, with a machine English translation.

INKJET HEAD, AND METHOD FOR PRODUCING INKJET HEAD

CROSS REFERENCE TO RELATED APPLICATION

This Application is a 371 of PCT/JP2020/034317 filed on Sep. 10, 2020, which is incorporated herein by reference.

TECHNICAL FIELD

The present invention relates to an inkjet head and an inkjet head manufacturing method. In particular, for an inkjet head having a channel substrate formed of silicon, the present invention relates to an inkjet head that can prevent the elution of silicon on the ink channel surface and the bonding interface between the channel substrates to be bonded, and can suppress the leakage of the ink from the bonding interface to the outside of the channel.

BACKGROUND ART

A silicon processing process is applied to ensure processing accuracy for the nozzles and channels of the inkjet head. Especially in a structure with a circulation channel, the nozzle substrate and the circulation channel substrate are processed and bonded separately, and the reliability of the bonding is directly linked to the durability of the inkjet head, as a result, this is a very important process. In addition, silicon has low chemical resistance to ink, and in particular, silicon is eluted with alkali, so there is a case in which a protective film having chemical resistance is formed. Since the protective film is also formed on the bonding interface between the nozzle substrate and the channel substrate, the material of the protective film is also an important factor for the reliability of the bonding strength.

For example, Patent Document 1 discloses a manufacturing method in which $SiO_2$ protective films are respectively formed on a nozzle substrate and a channel substrate and bonded. Although $SiO_2$ has higher chemical resistance to an ink than silicon, it is insufficient for the reliability required for industrial applications in recent years. In particular, if the $SiO_2$ protective film in the vicinity of the bonding interface between the nozzle substrate and the channel substrate dissolves into the ink, the bonding force between the substrates will decrease, causing the ink to leak out of the channel.

In addition, in Patent Document 1, the $SiO_2$ protective film is formed by thermal oxidation and a method of directly bonding the substrate is used. Adhesion of foreign matter during manufacturing may adversely affect the reliability of bonding. From the viewpoint of productivity, a bonding process with high robustness against foreign matter is desired.

CITATION LIST

Patent Literature

Patent Document 1: Japanese Patent No. 5361466

SUMMARY OF INVENTION

Technical Problem

The present invention has been made in view of the above problems and situations. The problem to be solved is, for an inkjet head having a channel substrate formed of silicon, to provide an inkjet head and a method for manufacturing the inkjet head capable of preventing the elution of silicon from the ink channel surface and the bonding interface between the channel substrates to be bonded, and suppressing the leakage of the ink from the bonding interface to the outside of the channel.

Solution to Problem

In order to solve the above problems, the inventors of the present invention found the following in the process of examining the causes of the above problems. Of the two channel substrates, on an ink channel surface formed of silicon, and on a surface of the channel substrate side formed of silicon in the adhesive layer formed on the bonding interface between the two substrates, a protective film containing a compound having a Si—C bond is formed. Thereby, the elution of silicon can be prevented and the leakage of the ink from the bonding interface to the outside of the channel can be suppressed, leading to the present invention. That is, the above problems related to the present invention are solved by the following means.

1. An inkjet head comprising a first and a second channel substrates, wherein at least one of the first and the second channel substrates is formed of silicon;

a bonding interface of the first and the second channel substrates is bonded via an adhesive layer; and a protective film containing a compound having a Si—C bond is formed on: an ink channel surface formed of silicon among the first and the second channel substrates; and a surface of the channel substrate side formed of silicon in the adhesive layer.

2. The inkjet head according to item 1, wherein at least one of the first and the second channel substrates is a substrate formed of silicon and containing a nozzle;

a protective film containing a compound having a Si—C bond is formed on: an ink channel surface formed of silicon of the substrate containing a nozzle; and a surface of the channel substrate side formed of silicon in the adhesive layer;

the protective film is further formed on a nozzle opening surface of the substrate including the nozzle; and a liquid-repellent film containing a fluorine-based compound having a siloxane bond is formed on the protective film on the nozzle opening surface.

3. The inkjet head according to item 1 or 2, wherein both the first and the second channel substrates are formed of silicon.

4. The inkjet head according to item 3, wherein both the first and the second channel substrates are formed of silicon, and at least one of the substrates is a substrate containing a nozzle;

a protective film containing a compound having a Si—C bond is formed on: an ink channel surface formed of silicon of the substrate containing a nozzle; and a surface of the channel substrate side formed of silicon in the adhesive layer;

the protective film is further formed on a nozzle opening surface of the substrate including the nozzle; and a liquid-repellent film containing a fluorine-based compound having a siloxane bond is formed on the protective film on the nozzle opening surface.

5. The inkjet head according to any one of items 1 to 4, wherein the protective film has a maximum peak in an energy band (99.9 to 100.9 eV) derived from a Si—C bond detected by X-ray photoelectron spectroscopy.

6. The inkjet head according to any one of items 1 to 5, wherein a surface layer of the protective film formed at the bonding interface is oxidized; and the adhesive layer contains a silane coupling agent.

7. A method for producing the inkjet head according to any one of items 1 to 6, comprising the steps of:

forming a protective film containing a compound having a Si—C bond on: an ink channel surface formed of silicon among the first and the second channel substrates; and a surface of the channel substrate side formed of silicon in the adhesive layer; and bonding a bonding interface of the first and the second channel substrates via an adhesive layer.

Advantageous Effects of Invention

According to the above-described means of the present invention, in an inkjet head having a channel substrate formed of silicon, it is possible to provide an inkjet head and a method for manufacturing an inkjet head that can prevent elution of silicon from the ink channel surface and the bonding interface between the channel substrates to be bonded, and can suppress leakage of the ink from the bonding interface to the outside of the channel.

Although the expression mechanism or action mechanism of the effects of the present invention has not been clarified, it is speculated as follows.

At least one of the first and the second channel substrates is formed of silicon. Among the first and the second channel substrates, on the ink channel surface formed of silicon and on a surface of the channel substrate side formed of silicon in the adhesive layer formed on the bonding interface between the two substrates, a protective film containing a compound having a Si—C bond is formed. Since the compound having the Si—C bond has extremely high chemical resistance, the protective film has a chemical resistance function. As a result, it is possible to prevent the elution of silicon on the ink channel surface and the bonding interface, and to suppress the leakage of the ink from the bonding interface to the outside of the channel. In addition, since the bonding interface of the first and the second channel substrates is bonded via an adhesive layer, the compound having a Si—C bond contained in the protective film formed at the bonding interface and the adhesive layer are easily adhered. As a result, the reliability of bonding at the bonding interface is enhanced, and leakage of the ink from the bonding interface to the outside of the channel can be suppressed. Furthermore, by bonding with an adhesive layer, foreign matter may be embedded in the adhesive layer compared to direct bonding of substrates formed of silicon, and in this respect also the reliability of bonding at the bonding interface is increased. In addition, compatibility with foreign matter during the formation of the protective film is high.

DESCRIPTION OF EMBODIMENTS

Figure 1:
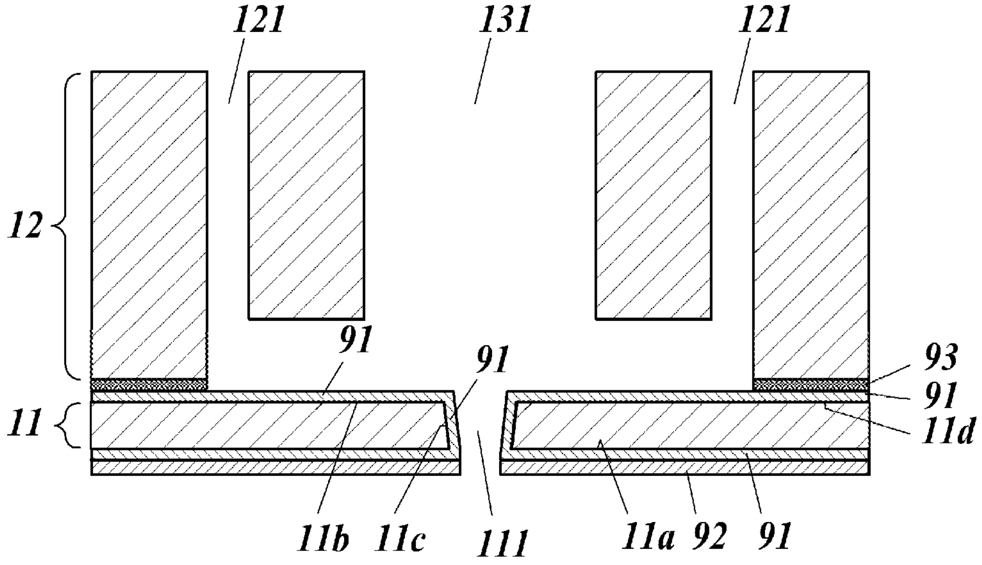
FIG. 1 This is a cross-sectional view showing a state in which the first and the second channel substrates according to the first embodiment of the present invention are bonded.

The inkjet head of the present invention is an inkjet head provided with a first and a second channel substrates, wherein at least one of the first and the second channel substrates is formed of silicon; a bonding interface of the first and the second channel substrates is bonded via an adhesive layer; and a protective film containing a compound having a Si—C bond is formed on: an ink channel surface formed of silicon among the first and the second channel substrates; and a surface of the channel substrate side formed of silicon in the adhesive layer. This feature is a technical feature common to or corresponding to each of the following embodiments.

It is preferable that at least one of the first and the second channel substrates is a substrate formed of silicon and including a nozzle, a protective film containing a compound having an Si—C bond is formed on the ink channel surface formed of silicon of the substrate including the nozzle and on a surface of the channel substrate side formed of silicon in the adhesive layer, the protective film is further formed on a nozzle opening surface of the substrate including the nozzle, and a liquid-repellent film containing a fluorine-based compound having a siloxane bond is formed on the protective film on the nozzle opening surface. Thereby, the protective film also functions as a base film for the liquid-repellent film containing the fluorine-based compound, and the durability of the liquid-repellent film containing the fluorine-based compound may be ensured.

It is preferable that both the first and the second channel substrates are formed of silicon in that processing accuracy for the ink channel may be ensured.

It is preferable that both the first and the second channel substrates are formed of silicon, and at least one of them is a substrate including a nozzle, a protective film containing a compound having an Si—C bond is formed on the ink channel surface formed of silicon of the substrate including the nozzle and on a surface of the channel substrate side formed of silicon in the adhesive layer, the protective film is further formed on a nozzle opening surface of the substrate including the nozzle, and a liquid-repellent film containing a fluorine-based compound having a siloxane bond is formed on the protective film on the nozzle opening surface. Thereby, the protective film also functions as a base film for the liquid-repellent film containing the fluorine-based compound, and the durability of the liquid-repellent film containing the fluorine-based compound may be ensured.

It is preferable that the protective film has a maximum peak in an energy band (99.9 to 100.9 eV) derived from a Si—C bond detected by X-ray photoelectron spectroscopy in that the protective film has excellent chemical resistance and may prevent elution of silicon.

When a surface layer of the protective film formed on the bonding interface is oxidized and the adhesive contains a silane coupling agent, the protective film and the silane coupling agent form a siloxane bond and the bonding strength may be increased. This is preferable.

The method for producing the inkjet head of the present invention contains the steps of: forming a protective film containing a compound having a Si—C bond on an ink channel surface formed of silicon among the first and the second channel substrates; and a surface of the channel substrate side formed of silicon in the adhesive layer; and bonding a bonding interface of the first and the second channel substrates via an adhesive layer. As a result, for an inkjet head having a channel substrate formed of silicon, it is possible to prevent the elution of silicon from the ink channel surface and the bonding interface between the channel substrates to be bonded, and to suppress the leakage of the ink from the bonding interface to the outside of the channel.

Hereinafter, the present invention, its constituent elements, and forms and embodiments for carrying out the present invention will be described below. In the present application, "to" is used to mean that the numerical values before and after "to" are included as the lower limit and the upper limit.

[Outline of Inkjet Head of the Present Invention]

The inkjet head of the present invention is an inkjet head comprising a first and a second channel substrates, wherein at least one of the first and the second channel substrates is formed of silicon, and a bonding interface of the first and the second channel substrates is bonded via an adhesive layer, and a protective film containing a compound having a Si—C bond is formed on an ink channel surface formed of silicon among the first and the second channel substrates; and a surface of the channel substrate side formed of silicon in the adhesive layer.

As shown in later-described FIGS. 5, 8, 9, and 13A, the inkjet head 100 has a plurality of nozzles 111, respectively. The inkjet head 100 ejects ink (liquid droplets) from nozzle holes of a plurality of nozzles 111 provided on the bottom surface (nozzle opening surface 11*a*) to the recording medium M carried on the conveying surface of the conveying drum 221, and ink droplets are landed.

The inkjet head 100 has a head chip 1, and the head chip 1 is configures by stacking a nozzle substrate 13, a channel substrate 12, and a pressure chamber substrate 13 in this order upward from the nozzle opening surface 11*a* side.

(1) First Embodiment

A case will be described below in which the channel substrate 12 is the first channel substrate according to the present invention, and the nozzle substrate 13 is the second channel substrate according to the present invention. Also, a case where the second channel substrate is formed of silicon and the first channel substrate is made of a material other than silicon will be described as an example. FIG. 1 is a cross-sectional view showing a state in which the first and the second channel substrates are bonded.

<First Channel Substrate>

The first channel substrate (channel substrate 12) has a thickness, for example, in the range of 100 to 1000 μm, and is made of a material other than silicon. Materials other than silicon include, for example, stainless steel (SUS), nickel, and an alloy (42 alloy) in which nickel is mixed with iron.

A plurality of pressure chambers 131 are formed in the first channel substrate 12 (only one pressure chamber 131 is shown in FIG. 1 for reasons of drawing). Further, an individual ink discharge path 121 branched from the pressure chamber 131 is formed in the first channel substrate 12. One end of the individual ink discharge path 121 is connected to the pressure chamber 131, and the other end is connected to a first common ink discharge path 134 (see FIG. 13A), which will be described later. It is a channel for discharging to the common ink discharge path 134. At least two individual ink discharge paths 121 are preferably provided for each pressure chamber 131 from the viewpoint of facilitating discharge of air bubbles and foreign substances together with the ink. In addition, in FIG. 1, the case where two are provided is illustrated.

<Second Channel Substrate>

The second channel substrate (nozzle substrate 11) is composed of a substrate made of a silicon single crystal layer with a thickness in the range of 10 to 100 μm, for example.

The second channel substrate 11 is provided with a nozzle 111 which is a hole penetrating in the thickness direction (up-down direction). The nozzle 111 communicates with the pressure chamber 131 and serves as an ejection port for ejecting ink stored in the pressure chamber 131 when pressure is applied to the ink in the pressure chamber 131.

A protective film 91 containing a compound having a Si—C bond is formed on the ink channel surfaces 11*b* and 11*c* of the second channel substrate 11. That is, when the surface of the second channel substrate 11 facing the first channel substrate 12, a protective film 91 containing the compound having the Si—C bond is formed on the surface 11*b* forming the ink channel and the wall surface 11*c* forming the nozzle 111 of the second channel substrate 11.

Further, a protective film 91 containing a compound having a Si—C bond is also formed on the bonding interface 11*d* between the second channel substrate 11 and the first channel substrate 12 and the nozzle opening surface (bottom surface) 11*a*.

The composition analysis of the protective film 91 may be performed according to a conventional method using an X-ray photoelectron spectrometer (XPS) shown below.

For example, a protective film for measurement with a thickness of about 200 nm is formed on a silicon substrate, and this is used as a sample for measurement of a Si—C bond or a Si—O bond in the protective film, and a Si—C bonds or a Si-bonds may be determined by the XPS compositional analysis shown below.

(XPS Composition Analysis)

Device name: X-ray photoelectron spectrometer (XPS)

Device model: Quantera SXM

Equipment manufacturer: ULVAC-PHI

Measurement conditions: X-ray source=Monochromatic Al Kα ray 25 W-15 kV

Degree of vacuum: $5.0\times10^{-8}$ Pa

Furthermore, when performing composition analysis in the film thickness direction, depth direction analysis may be performed by repeating argon ion etching and XPS analysis. For data processing, MultiPak manufactured by ULVAC-PHI is used.

It is preferable that the protective film 91 has a maximum peak in the energy band (99.9 to 100.9 eV) derived from a Si—C bond detected using XPS in the point that it has excellent chemical resistance and can prevent elution of silicon.

Further, it is preferable that the surface layer of the protective film 91 formed on the bonding interface 11*d* is oxidized. The oxidation method includes air oxidation, more preferably, for example, oxygen plasma treatment, UV ozone treatment, RCA cleaning, and ozone water treatment. This is preferable in that it forms a siloxane bond with a silane coupling agent contained in the adhesive layer 93, which will be described later, and increases the bonding strength at the bonding interface 11*d*.

It is preferable that a liquid-repellent film 92 is further formed on the protective film 91 formed on the nozzle opening surface 11*a* of the second channel substrate 11. The liquid-repellent film 92 is a film containing a fluorine-based compound having a siloxane bond. For example, it has a configuration in which fluorine is formed on the surface of perfluoropolyether (PFPE), and has liquid repellency (ink repellency). Therefore, since the protective film 91 formed as the base of the liquid-repellent film 92 is a film having a Si—O bond, the liquid-repellent film 92 and the protective film 91 are bonded by siloxane bonds.

The first channel substrate 12 and the second channel substrate 11 as described above are bonded via an adhesive layer 93 at the bonding interface.

When the thickness of the adhesive layer 93 is in the range of 0.5 to 100 μm, foreign matter may be embedded in the adhesive layer 93, and the adhesive does not come off, thereby improving the reliability of bonding at the bonding interface. More preferably, the thickness is in the range of 0.5 to 2 μm.

For the adhesive layer 93, it is preferable to use, for example, KBM-403 (Shin-Etsu Chemical Co., Ltd.) as a silane coupling agent and Epotek 353ND (manufactured by Epoxy Technology Corporation) as an adhesive material. Therefore, since the protective film 91 formed on the bonding interface 11*d* of the second channel substrate 11 with the first channel substrate 12 is a film having Si—O bonds. The protective film 91 and the silane coupling agent contained in the adhesive layer 93 forms a siloxane bond. As a result, the bonding strength between the first channel substrate 12 and the second channel substrate 11 may be increased.

In the first channel substrate 12 and the second channel substrate 11 that are thus bonded together via the adhesive layer 93, a pressure chamber substrate 13 (see FIG. 9 and FIG. 13A) to be described later is provided on the first channel substrate 12. A voltage is applied to the drive electrodes provided on the pressure chamber substrate 13, pressure is applied to the ink in the pressure chamber 131, and the ink is ejected from the nozzles 111 of the second channel substrate 11.

Figure 16:
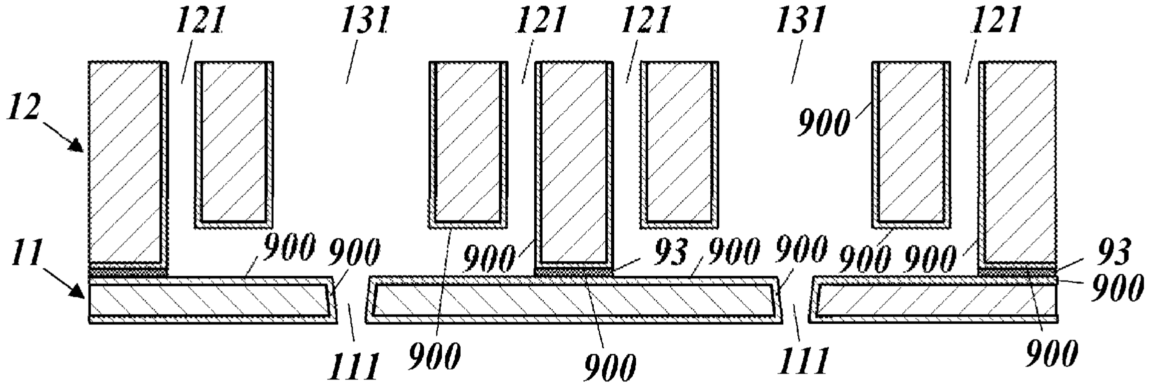
FIG. 16 This is a cross-sectional view showing a state in which two channel substrates are bonded to show a conventional example.
Figure 17:
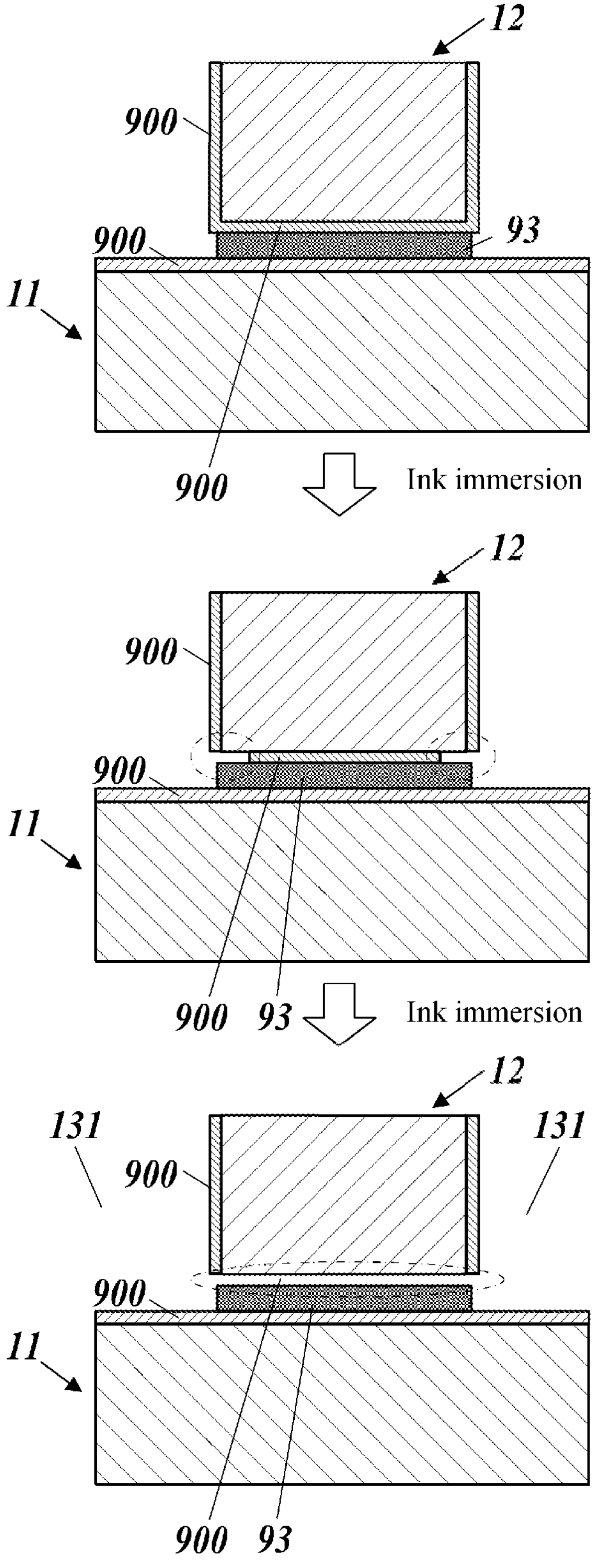
FIG. 17 This is an enlarged view of a main part of FIG. 16.

As described above, of the first and the second channel substrates 12 and 11, the second channel substrate 11 is formed of silicon and includes a nozzle, a protective film 91 containing a compound having a Si—C bond is formed on the ink channel surfaces 11*b* and 11*c* formed of silicon of the second channel substrate 11 and on the bonding interface 11*d* between the substrates 12 and 11. The protective film 91 is further formed on the nozzle opening surface 11*a* of the second channel substrate 11, and a liquid-repellent film 92 containing a fluorine-based compound having a siloxane bond is formed on the protective film 91 of the nozzle opening surface 11*a*. Since the compound having the Si—C bond has a very high chemical resistance, the protective film 91 has a chemical resistance function. As a result, it is possible to prevent the elution of silicon from the ink channel surfaces 11*b* and 11*c*, the bonding interface 11*d*, and the nozzle interface 11*a*. In particular, it is possible to suppress leakage of the ink from the bonding interface 11*d* to the outside of the channel. For example, as shown in FIG. 16 and FIG. 17, when a $SiO_2$ film 900 is provided on the ink channel surface or the bonding interface, the chemical resistance is low, and the $SiO_2$ film 900 is eluted by the ink, the ink channel communicates at the bonding interface, and the ink leaks between the adjacent pressure chamber 131, which causes ejection failure. However, according to the present invention, since the protective film 91 contains a compound having a Si—C bond, it is possible to suppress such ink leakage and ejection failure. In addition, in FIG. 16 and FIG. 17, the same symbol is attached to the structure similar to FIG. 1.

[Production Method of Inkjet Head]

Next, a method for producing the inkjet head 100 will be described. The method for producing an inkjet head of the present invention contains the steps of: forming a protective film containing a compound having a Si—C bond on an ink channel surface formed of silicon among the first and the second channel substrates and on a bonding interface between the two substrates (protective film forming step); and bonding the bonding interface of the first and the second channel substrates via an adhesive layer (bonding step).

FIG. 2A to FIG. 2H are cross-sectional views showing production steps of the inkjet head 100 shown in FIG. 1. In the production of the inkjet head 100, a plurality of pressure chamber 111 are formed in one first channel substrate 12. Here, the case of forming one pressure chamber 111 is representatively shown.

Figure 2A:
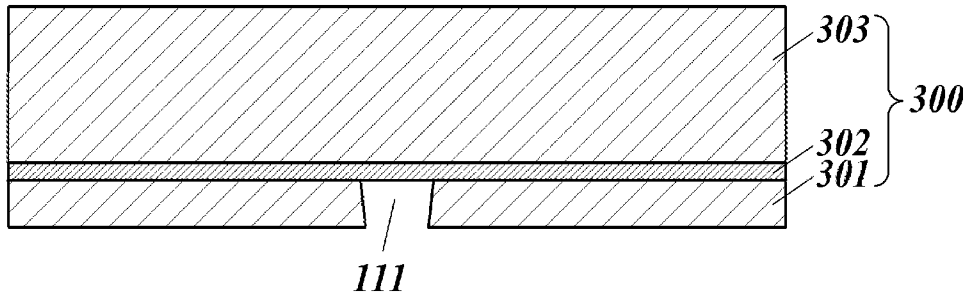
FIG. 2A This is a cross-sectional view showing the producing process of the inkjet head in FIG. 1.

As shown in FIG. 2A, first, one wafer-shaped substrate 300 is prepared. As the wafer-shaped substrate 300, crystalline silicon (Si), which is widely used in MEMS (Micro Electro Mechanical Systems), may be used. Here, it is preferable to use an SOI (Silicon on Insulator) substrate structure having an active layer 301 formed with nozzles 111 to serve as the second channel substrate 11 and a support layer 303 formed on the active layer 301 with an etching stopper layer 302 interposed therebetween. The active layer 301 is formed of silicon and serves as the second channel substrate 11 on which the nozzle 111 is formed. The nozzle 111 is formed by performing resist patterning with photolithography and processing by dry etching or wet etching. The thickness of the active layer 301 is preferably within the range of 10 to 100 μm.

The etching stopper layer 302 has a function as an etching stopper when forming the nozzle hole, and contains $SiO_2$. The thickness of the etching stopper layer 302 is preferably in the range of 0.1 to 5 μm.

The support layer 303 is formed of silicon like the active layer 301 and supports the active layer 301 via the etching stopper layer 302. The thickness of the support layer 303 is preferably in the range of 200 to 800 μm.

Figure 2B:
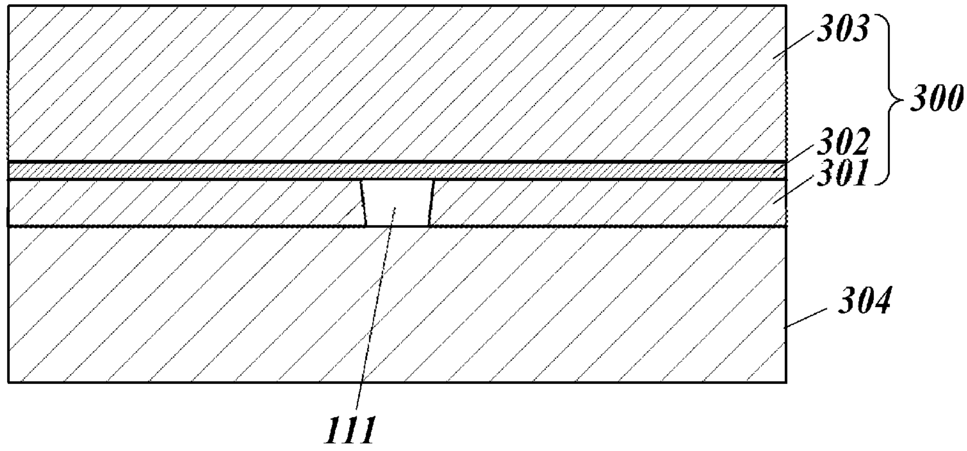
FIG. 2B This is a cross-sectional view showing the producing process of the inkjet head in FIG. 1.

Next, as shown in FIG. 2B, in order to remove the support layer 303, a temporary fixing substrate 304 is temporarily attached to the surface of the active layer 301 opposite to the etching stopper layer 302. Temporarily bonding the temporary fixing substrate 304 facilitates handling of the active layer 301 having a thickness of 100 μm or less. The temporary fixing substrate 304 is preferably formed of silicon, glass, or ceramics (alumina). Examples of the bonding method include a foam sheet Revalpha (manufactured by Nitto Denko Corporation).

Figure 2C:
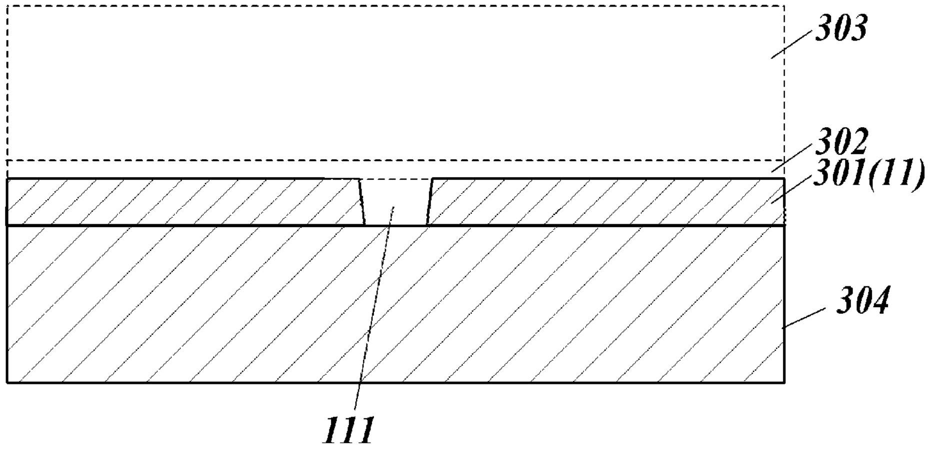
FIG. 2C This is a cross-sectional view showing the producing process of the inkjet head in FIG. 1.

After the temporary fixing substrate 304 is temporarily attached, the support layer 303 and the etching stopper layer 302 are removed by etching, and the active layer 301 becomes the second channel substrate 11, as shown in FIG. 2C. Specifically, the support layer 303 is preferably subject to dry-etched using $SF_6$ gas, and the etching stopper layer 302 is preferably subject to wet-etched using hydrofluoric acid.

Figure 2D:
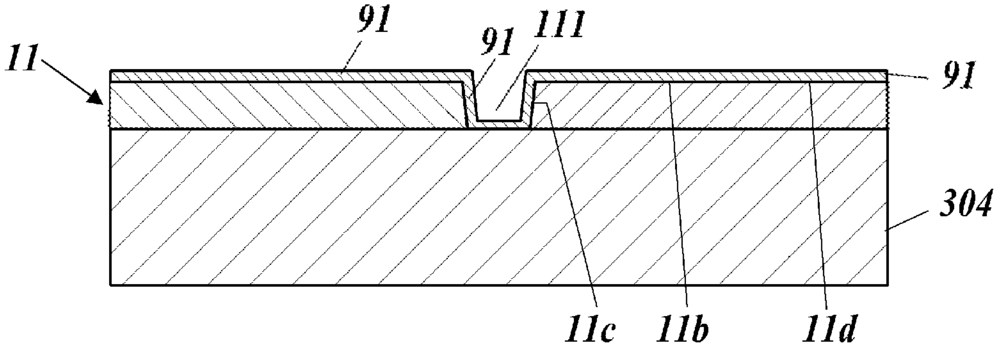
FIG. 2D This is a cross-sectional view showing the producing process of the inkjet head in FIG. 1.

Next, as shown in FIG. 2D, when the surface of the second channel substrate 11 facing the first channel substrate 12 is bonded to the first channel substrate 12, a protective film 91 containing a compound having a Si—C bond is formed on the surface 11*b* forming the ink channel, the wall surface 11*c* forming the nozzle 111, and the bonding interface 11*d* with the first channel substrate 12 (protective film forming step). Examples of methods for forming the protective film 91 include CVD and sputtering. In addition, after the protective film 91 is formed, the second channel substrate 11 is preferably washed to remove foreign matter. Here, since the second channel substrate 11 is formed of silicon, RCA cleaning is preferably used.

Figure 2E:
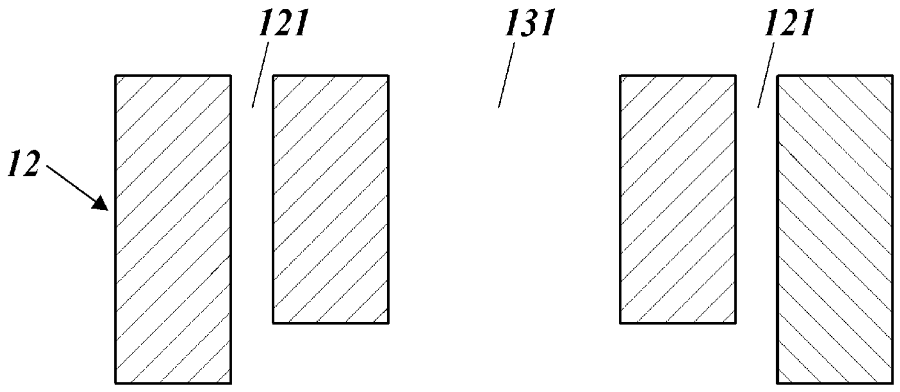
FIG. 2E This is a cross-sectional view showing the producing process of the inkjet head in FIG. 1.

Next, as shown in FIG. 2E, the first channel substrate 12 made of a material other than silicon and having the pressure chamber 131 and the individual ink discharge path 121 formed thereon is prepared. The pressure chamber 131 and the individual ink discharge path 121 are processed by, for example, photolithography and etching processes.

Figure 2F:
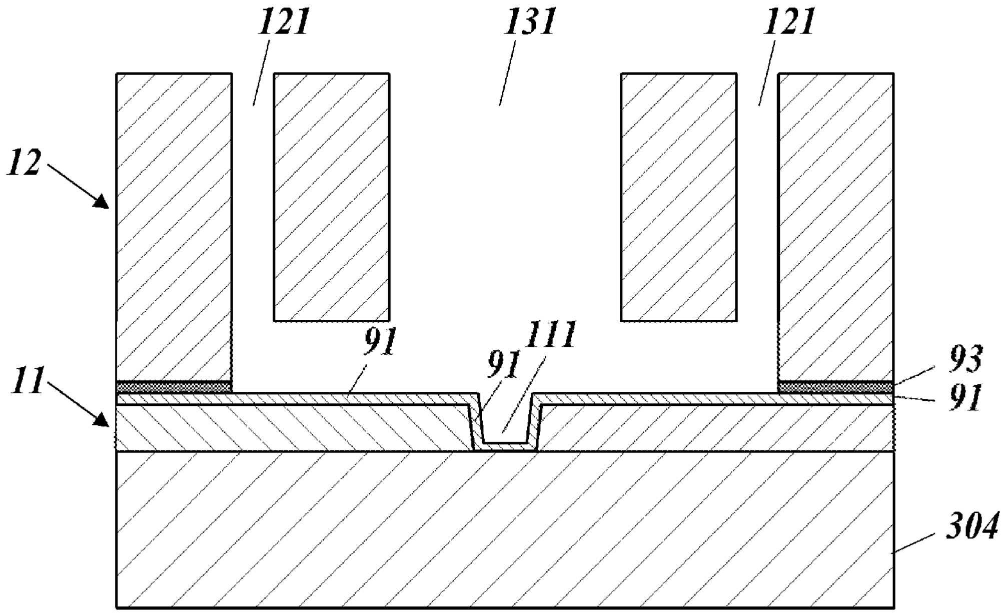
FIG. 2F This is a cross-sectional view showing the producing process of the inkjet head in FIG. 1.

Next, as shown in FIG. 2F, the first channel substrate 12 is bonded via the adhesive layer 93 to the second channel substrate 11 to which the temporary fixing substrate 304 is adhered (bonding process). The adhesive layer 93 may be formed, for example, by applying the above-described adhesive by screen printing.

Figure 2G:
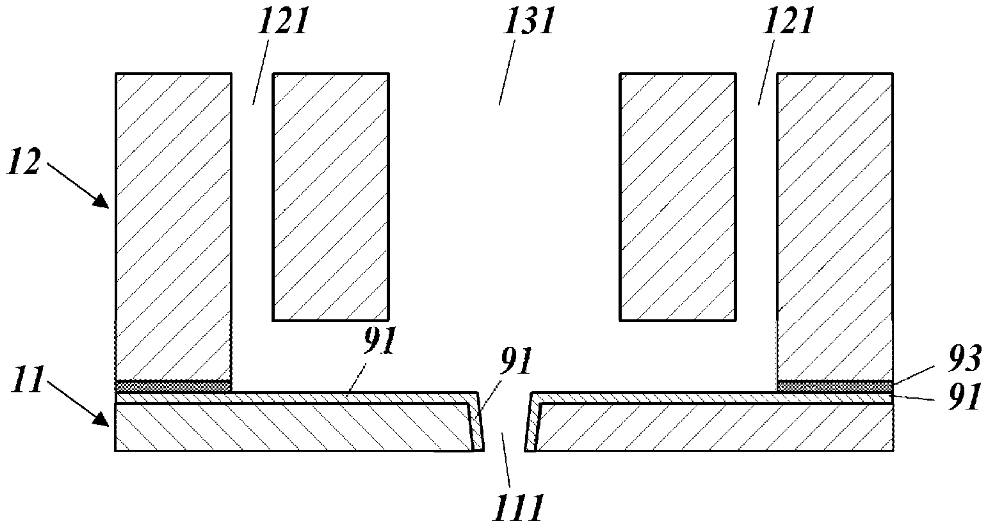
FIG. 2G This is a cross-sectional view showing the producing process of the inkjet head in FIG. 1.

Next, as shown in FIG. 2G, the temporary fixing substrate 304 is removed by heat treatment to peel off the foam sheet.

Figure 2H:
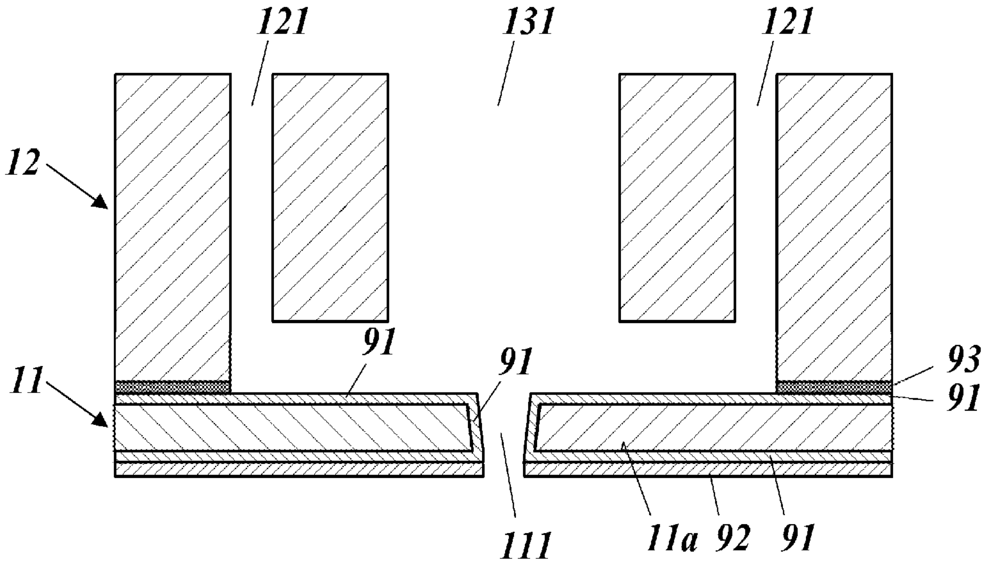
FIG. 2H This is a cross-sectional view showing the producing process of the inkjet head in FIG. 1.

Finally, as shown in FIG. 2H, the protective film 91 is formed on the nozzle opening surface 11*a* of the second channel substrate 11 from which the temporary fixing substrate 304 has been removed. Further, the liquid-repellent film 92 is formed on the protective film 91 formed on the nozzle opening surface 11*a* (see FIG. 1).

The protective film 91 is preferably formed by CVD or sputtering. The liquid-repellent film 92 is preferably formed by dipping. In the dipping process, the nozzle opening surface 11*a* of the second channel substrate 11 is immersed in a liquid-repellent agent (dip coating), so that the nozzle opening surface 11*a* is coated with the liquid-repellent agent. As the liquid-repellent agent, for example, a liquid obtained by diluting a predetermined perfluoropolyether (PFPE) with a fluorine-based solvent may be used. This liquid-repellent agent may further contains water as a solvent, and may contain a surfactant. As for the coating method, CVD, spray coating, spin coating, and wire bar coating (when using a siloxane-grafted polymer), may be used in addition to the dip treatment.

After forming the liquid-repellent film 92, the pressure chamber substrate 13, which will be described later, is further bonded onto the first channel substrate 12 of the bonded first and second channel substrates 12 and 11. Thereby a head chip 1 is formed, and then a drive circuit board 4 and an ink supply path are connected through a wiring board 2 and a flexible board 3 to form an inkjet head 100 (see FIG. 7A, FIG. 7B, and FIG. 8).

(2) Second Embodiment

Figure 3:
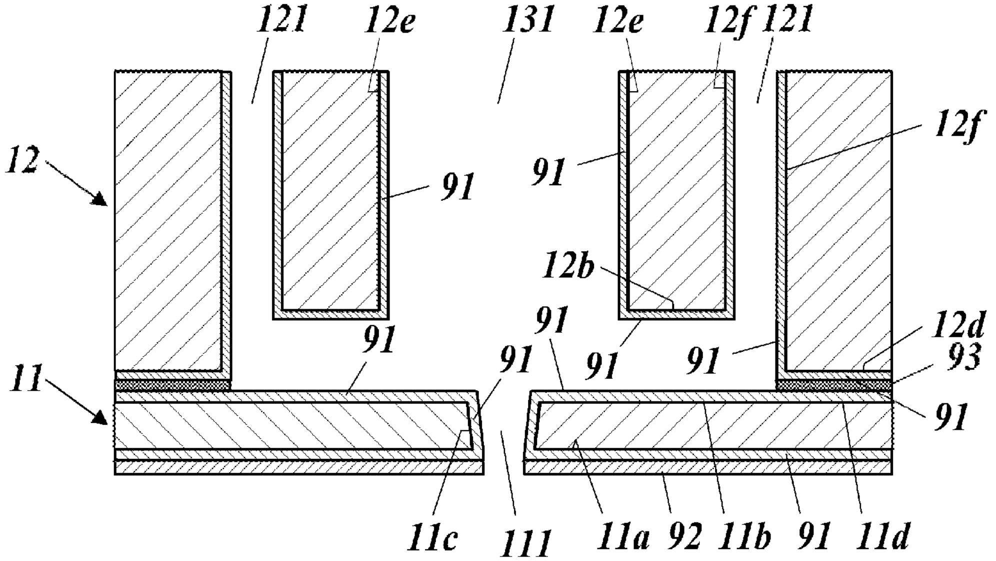
FIG. 3 This is a cross-sectional view showing a state in which the first and the second channel substrates according to the second embodiment of the present invention are bonded.

The second embodiment is the same as the first embodiment except that, in the second embodiment, both the first channel substrate 12 and the second channel substrate 11 are formed of silicon, and the protective film 91 is formed on the ink channels surfaces 12*b*, 12*e*, and 12*f* of the first channel substrate 12, and on the bonding interface 12*c* between the first channel substrate 12 and the second channel substrate 11. That is, the second channel substrate 11 according to the second embodiment is formed of silicon in the same manner as the second channel substrate 11 according to the first embodiment, and the protective film 91 is formed at the same location. The first channel substrate 12 will be described below. FIG. 3 is a cross-sectional view showing a state in which the first and second channel substrates are bonded.

<First Channel Substrate>

The first channel substrate 12 according to the second embodiment is composed of a semiconductor substrate or a SOI substrate made of single crystal Si (silicon) with a thickness in the range of 200 to 800 μm, for example.

The pressure chamber 131 and the individual ink discharge path 121 are formed in the first channel substrate 12 according to the second embodiment, similarly to the first channel substrate 12 according to the first embodiment.

Further, on the ink channel surfaces 12*b*, 12*e*, and 12*f* of the first channel substrate 12, a protective film 91 containing a compound having Si—C bonds is formed.
That is, when the surface of the first channel substrate 12 facing the second channel substrate 11 is bonded to the first channel substrate 12, the protective film 91 is formed on the surface 12*b* forming the ink channel, the wall surface 12*e* forming the pressure chamber 131, and the wall surface 12*f* forming the individual ink discharge path 121, respectively. A protective film 91 containing a compound having a Si—C bond is also formed at the bonding interface 12*d* between the first channel substrate 12 and the second channel substrate 11.

[Production Method of Inkjet Head]

Next, a method for producing the inkjet head 100 according to the second embodiment will be described. FIG. 4A to FIG. 4I are a cross-sectional view showing the producing process of the inkjet head 100. FIG. 4A to 4D and FIG. 4G to FIG. 4I are the same as the steps of FIG. 2A to FIG. 2D and FIG. 2F to FIG. 2H described in the production method of the inkjet head 100 according to the first embodiment. Therefore, the description of these is omitted.

Figure 4A:
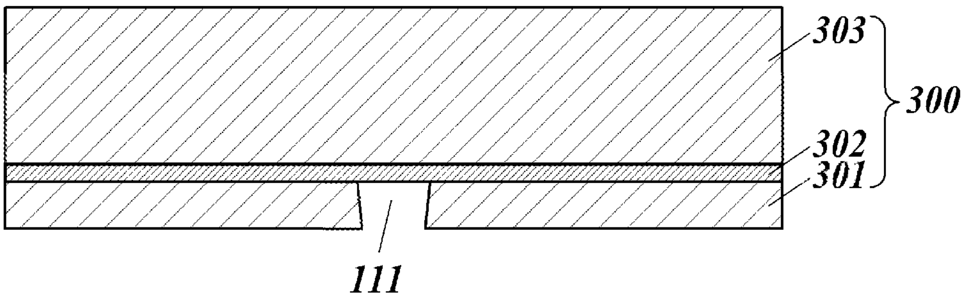
FIG. 4A This is a cross-sectional view showing the producing process of the inkjet head in FIG. 3.
Figure 4B:
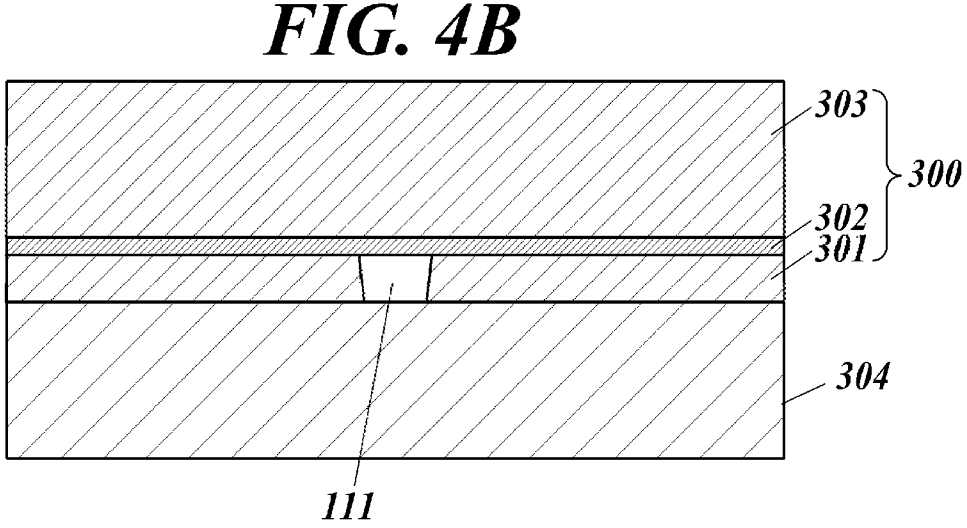
FIG. 4B This is a cross-sectional view showing the producing process of the inkjet head in FIG. 3.
Figure 4C:
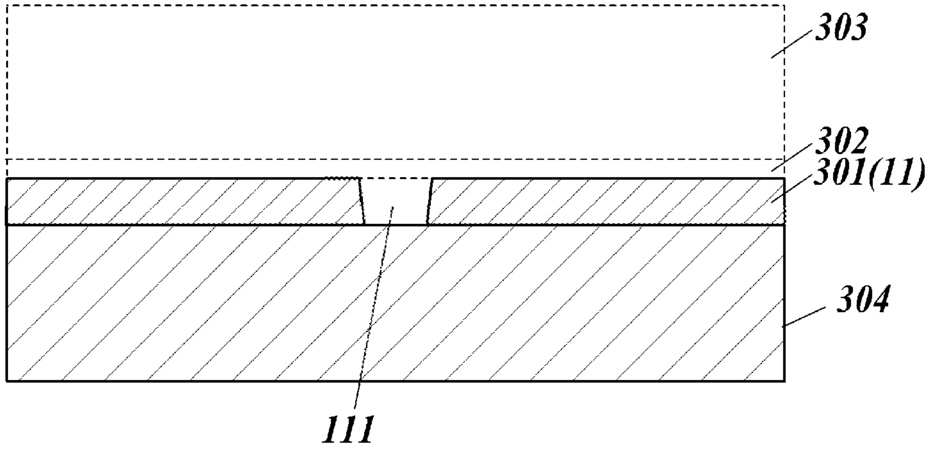
FIG. 4C This is a cross-sectional view showing the producing process of the inkjet head in FIG. 3.
Figure 4D:
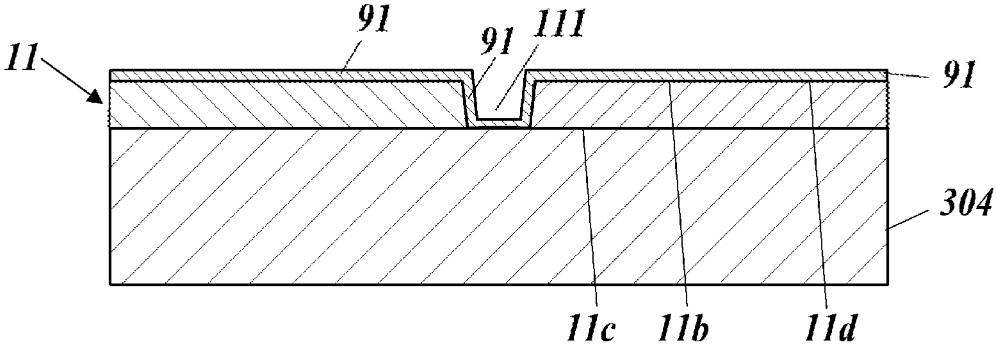
FIG. 4D This is a cross-sectional view showing the producing process of the inkjet head in FIG. 3.
Figure 4E:
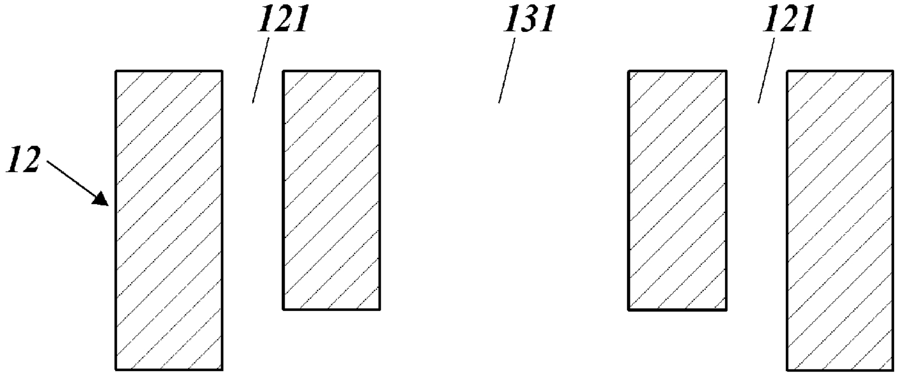
FIG. 4E This is a cross-sectional view showing the producing process of the inkjet head in FIG. 3.

After the steps shown in FIG. 4A to FIG. 4D, as shown in FIG. 4E, the first channel substrate 12 formed of silicon and having the pressure chamber 131 and the individual ink discharge path 121 formed therein is prepared. The pressure chamber 131 and the individual ink discharge paths 121 are processed by, for example, photolithography and etching processes.

Figure 4F:
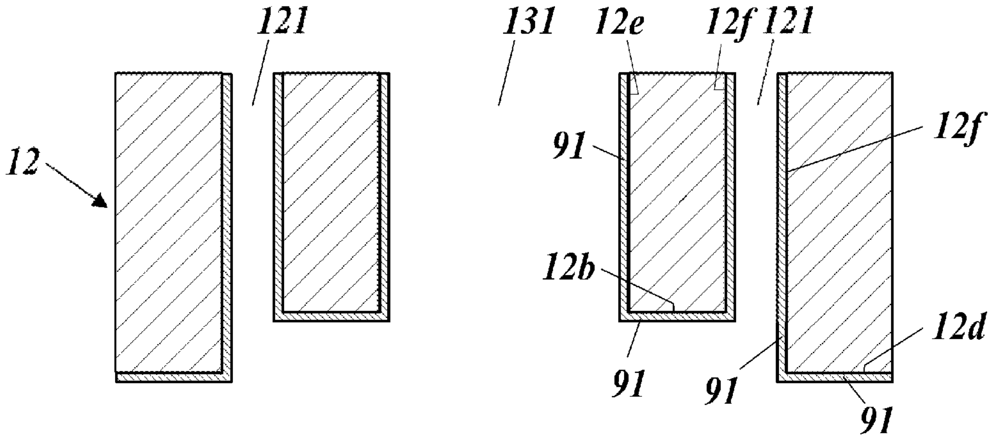
FIG. 4F This is a cross-sectional view showing the producing process of the inkjet head in FIG. 3.

As shown in FIG. 4F, when the ink channel surface of the first channel substrate 12, that is, the surface facing the first channel substrate 12 among the first channel substrate 12, is bonded to the first channel substrate 12, the protective film 91 is formed on the surface 12*b* forming the ink flow path, the wall surface 12*e* forming the pressure chamber 131, and the wall surface 12*f* forming the individual ink discharge path 121, respectively. Also, the protective film 91 is formed on the bonding interface 12*d* between the first channel substrate 12 and the second channel substrate 11 as well.
Examples of methods for forming the protective film 91 include CVD and sputtering. After forming the protective film 91, it is preferable that the first channel substrate 12 is washed to remove foreign matter. Here, since the first channel substrate 12 is formed of silicon, RCA cleaning is preferably used.

Figure 4G:
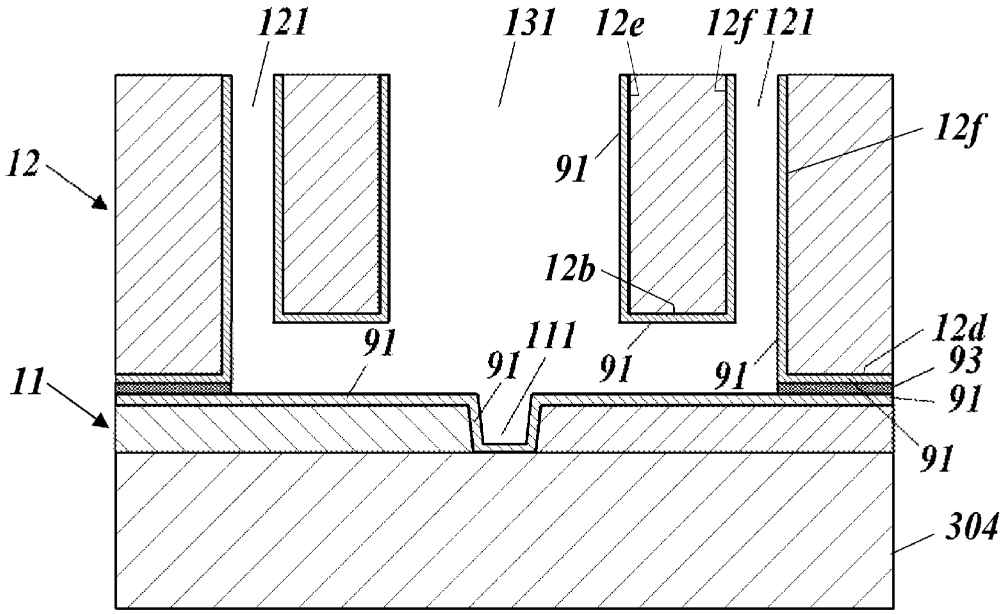
FIG. 4G This is a cross-sectional view showing the producing process of the inkjet head in FIG. 3.
Figure 4H:
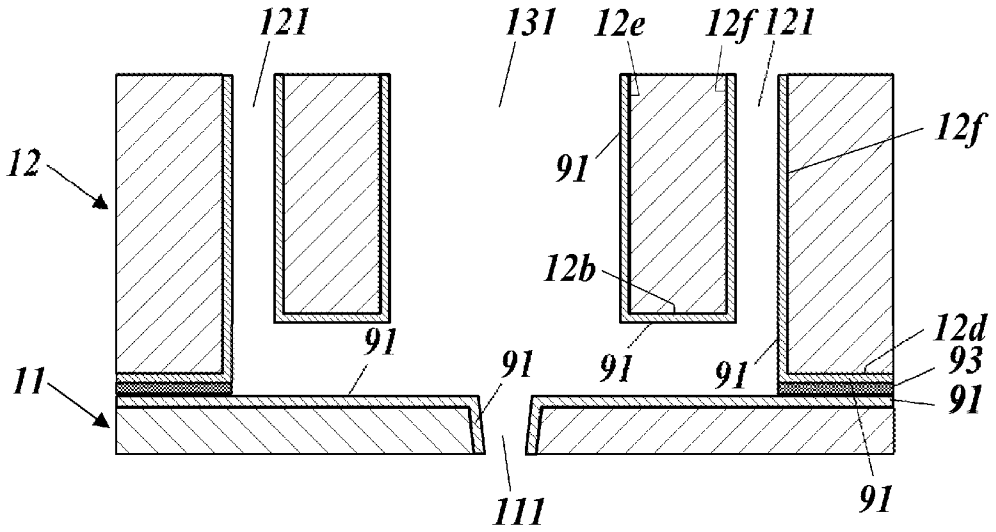
FIG. 4H This is a cross-sectional view showing the producing process of the inkjet head in FIG. 3.
Figure 4I:
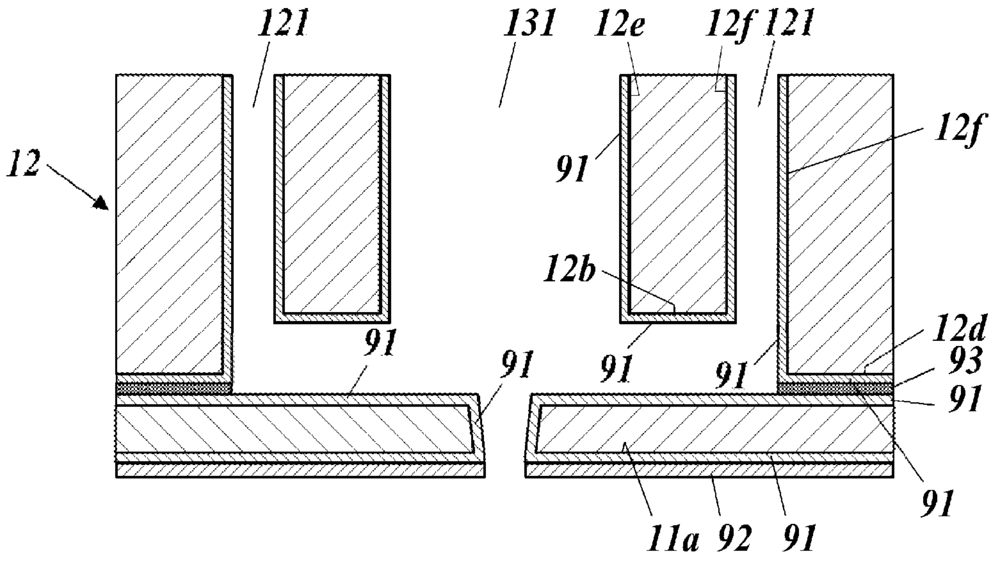
FIG. 4I This is a cross-sectional view showing the producing process of the inkjet head in FIG. 3.

After that, through the steps shown in FIG. 4G to FIG. 4I, the first and the second channel substrates 12 and 11 are bonded.

[Inkjet Recording Apparatus]

Next, an inkjet recording apparatus equipped with the inkjet head of the present invention will be described. In the following description, for convenience, the print width direction, which is the direction in which the nozzles 111 of the inkjet head 100 are arranged, is defined as the left-right direction, and the direction in which the recording medium is conveyed under the nozzles 111 is defined as the front-rear direction. A direction perpendicular to the direction is described as an up-down direction. Also, the arrows in the channels in the drawings indicate the directions of the ink flows.

Figure 5:
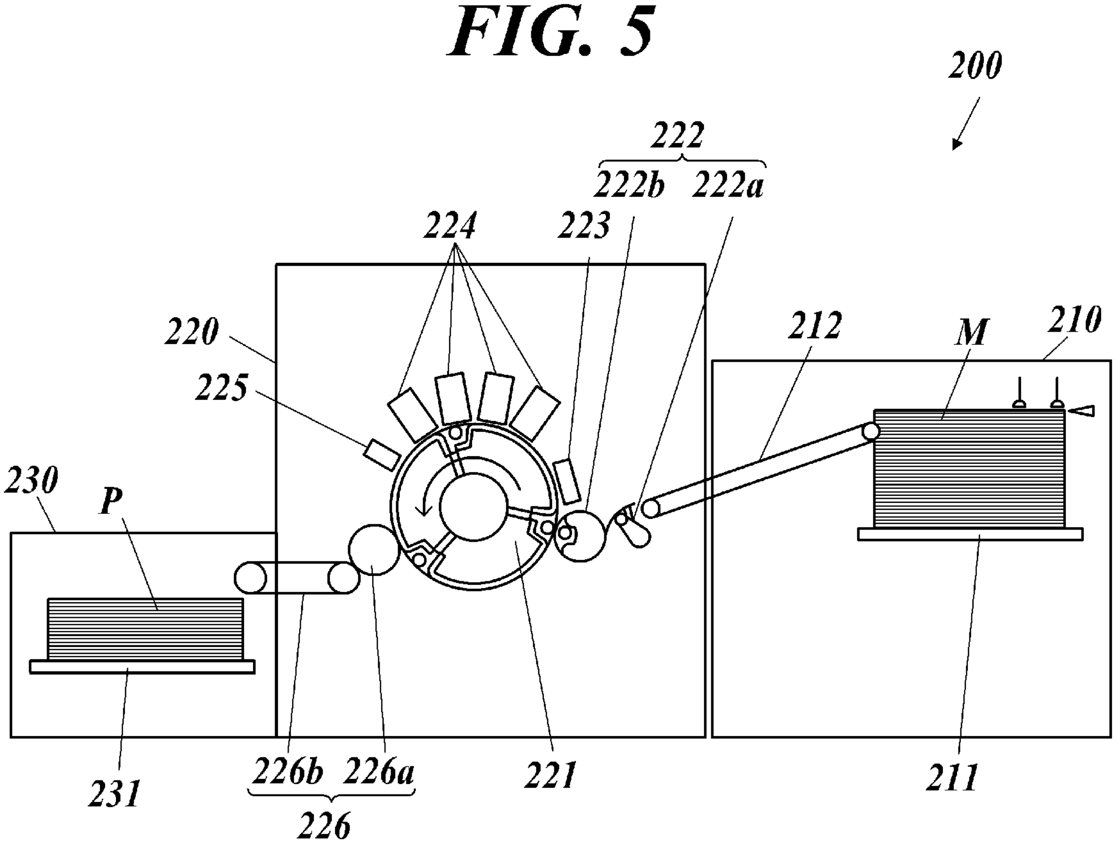
FIG. 5 This is a schematic diagram showing an inkjet recording device.
Figure 6:
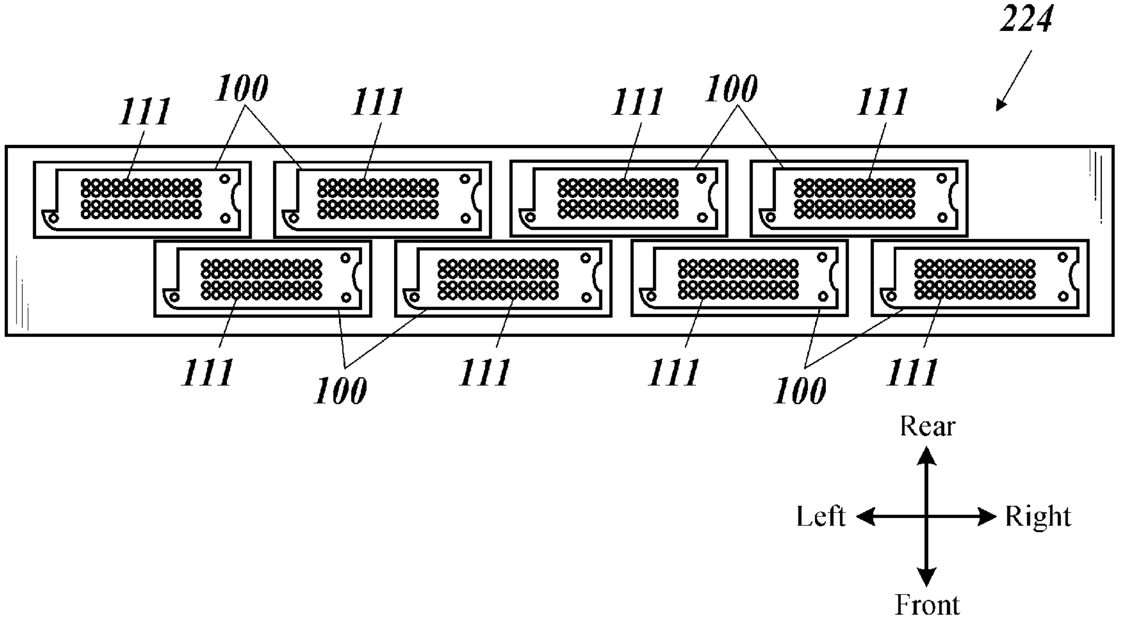
FIG. 6 This is a bottom view of a head unit.
Figure 15:
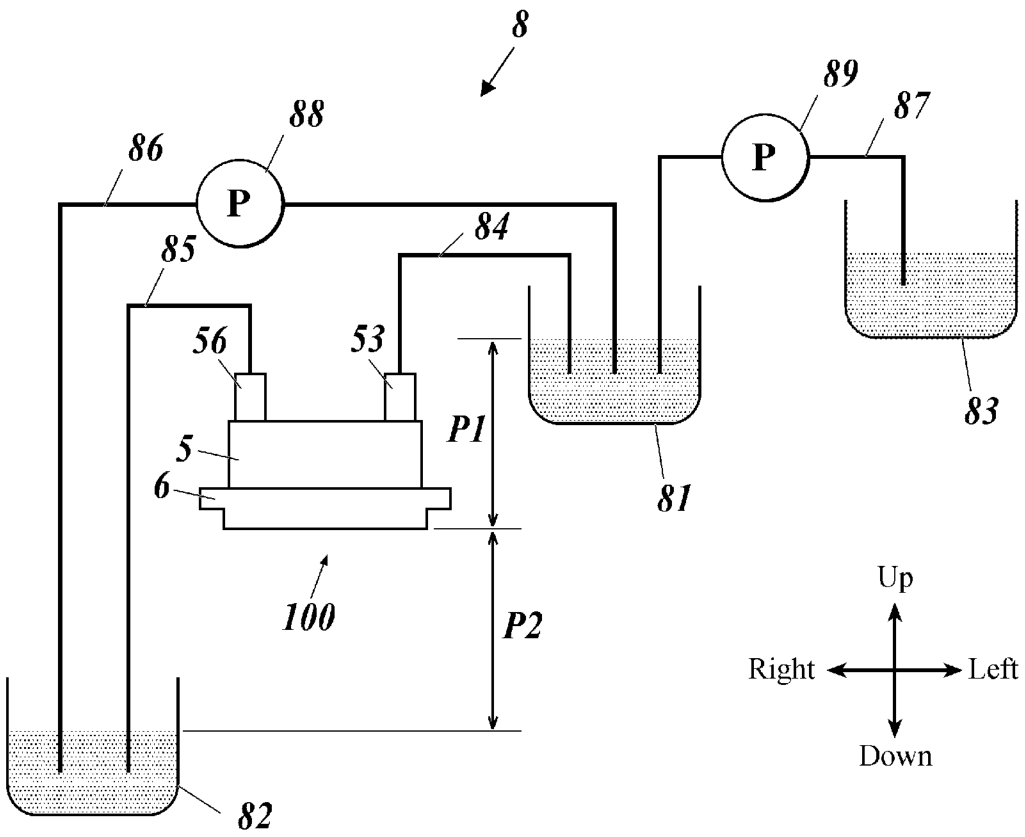
FIG. 15 This is a schematic diagram showing an ink circulation system.

The inkjet recording apparatus 200, as shown in FIG. 5, includes a paper feeding unit 210, an image recording unit 220, a paper discharge unit 230, and an ink circulation system (see FIG. 15) as an ink supply device. The inkjet recording apparatus 200 conveys the recording medium M stored in the paper feeding unit 210 to the image recording unit 220, forms an image on the recording medium M in the image recording unit 220, and the recording medium M on which the image is formed is conveyed to the paper discharge unit 230.

The paper feeding unit 210 includes a paper feed tray 211 that stores the recording medium M, and a medium supply unit 212 that conveys and supplies the recording medium M from the paper feed tray 211 to the image recording unit 220. The medium supply unit 212 includes a ring-shaped belt whose inner side is supported by two rollers, and the recording medium M is fed from the paper feed tray 211 by rotating the rollers while the recording medium M is placed on the belt. It is conveyed to the image recording unit 220.

The image recording unit 220 includes a conveying drum 221, a delivery unit 222, a heating unit 223, a head unit 224, a fixing unit 225, and a delivery unit 226.

The conveying drum 221 has a cylindrical surface, and an outer peripheral surface thereof serves as a conveying surface on which the recording medium M is placed. The conveying drum 221 conveys the recording medium M along the conveying surface by rotating in the direction of the arrow in FIG. 1 while holding the recording medium Mon the conveying surface. In addition, the conveying drum 221 includes a claw portion and a suction portion (not shown). The end of the recording medium M is pressed by the claw. In addition, the recording medium M is held on the conveying surface by drawing the recording medium M toward the conveying surface using the suction unit.

The delivery unit 222 is provided between the medium supply unit 212 of the paper supply unit 210 and the conveying drum 221, and picks up the recording medium M conveyed from the medium supply unit 212 by holding one end of the recording medium M conveyed from the medium supply unit 212 with the swing arm 222*a*. It is transferred to the conveying drum 221 via the delivery drum 222*b*.

The heating unit 223 is provided between the arrangement position of the delivery drum 222*b* and the arrangement position of the head unit 224, and heats the recording medium M conveyed by the conveying drum 221 so that the temperature of the recording medium M is within a predetermined temperature range. The heating unit 223 has, for example, an infrared heater, and energizes the infrared heater based on a control signal supplied from a control unit (not shown) to cause the heater to generate heat.

Based on the image data, the head unit 224 ejects an ink onto the recording medium M at an appropriate timing according to the rotation of the conveying drum 221 holding the recording medium M to form an image. The head unit 224 is arranged with an ink ejection surface facing the conveying drum 221 at a predetermined distance. In the inkjet recording apparatus 200 of the present embodiment, for example, four head units 224 respectively corresponding to four color inks of yellow (Y), magenta (M), cyan (C), and black (K) are used to print the recording medium M, which are arranged in the order of Y, M, C, and K at predetermined intervals from the upstream side in the conveying direction of the recording medium M.

In the head unit 224, for example, as shown in FIG. 2, a pair of inkjet heads 100 adjacent in the front-rear direction are arranged in a staggered manner at different positions in the front-rear direction. Further, the head unit 224 is used in a fixed position with respect to the rotating shaft of the conveying drum 221 when recording an image. That is, the inkjet recording apparatus 200 is an inkjet recording apparatus 200 that performs image recording by a one-pass drawing method using a line head.

The fixing unit 225 has a light emitting unit arranged across the width of the conveying drum 221 in the X direction, and irradiates the recording medium M placed on the conveying drum 221 with energy rays such as ultraviolet rays from the light emitting unit. Then, the ink ejected onto the recording medium M is cured and fixed. The light emitting unit of the fixing unit 225 is arranged downstream of the arrangement position of the head unit 224 and upstream of the arrangement position of the delivery drum 226*a* of the delivery unit 226 in the conveyance direction, facing the conveyance surface.

The delivery unit 226 has a belt loop 226*b* having a ring-shaped belt whose inside is supported by two rollers, and a cylindrical delivery drum 226*a* that delivers the recording medium M from the conveying drum 221 to the belt loop 226*b*. The recording medium M transferred from the conveying drum 221 onto the belt loop 226*b* by the delivery drum 226*a* is conveyed by the belt loop 226*b* and delivered to the paper discharge unit 230.

The paper discharge unit 230 has a plate-shaped paper discharge tray 231 on which the printed recording medium PM delivered from the image recording unit 220 by the delivery unit 226 is placed.

[Inkjet Head]

Figure 7A:
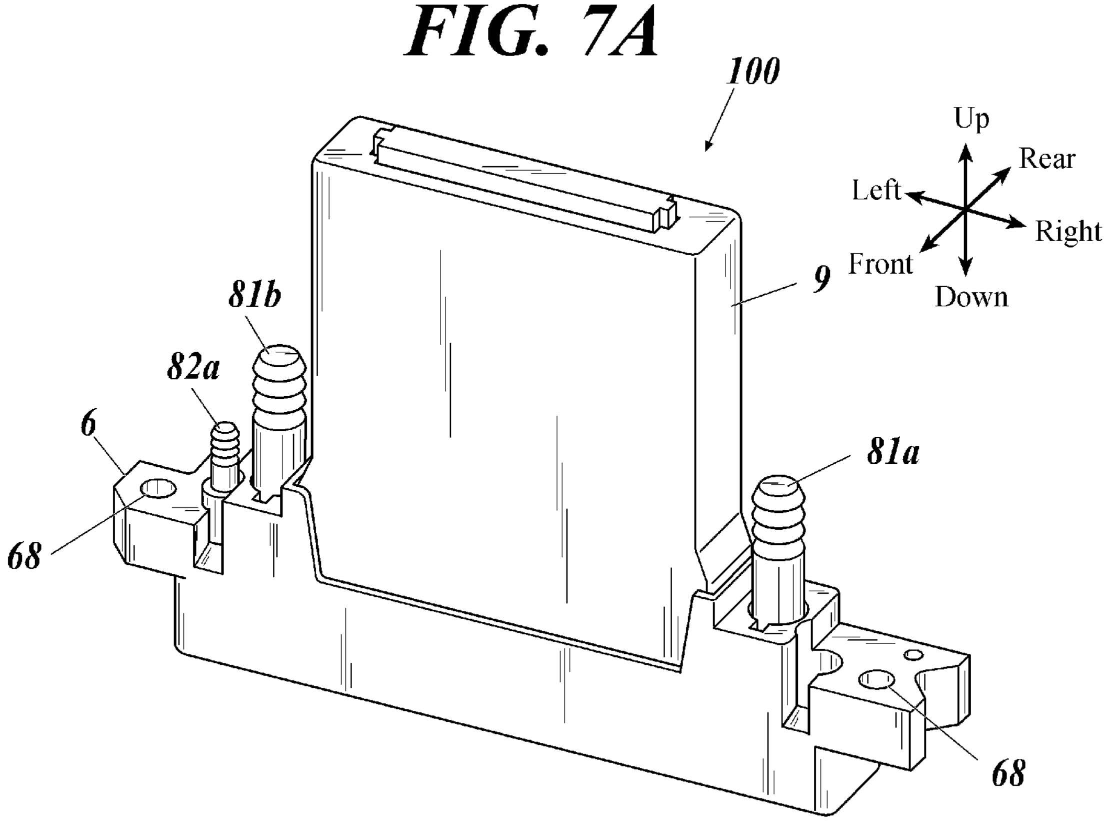
FIG. 7A This is a perspective view of an inkjet head.
Figure 7B:
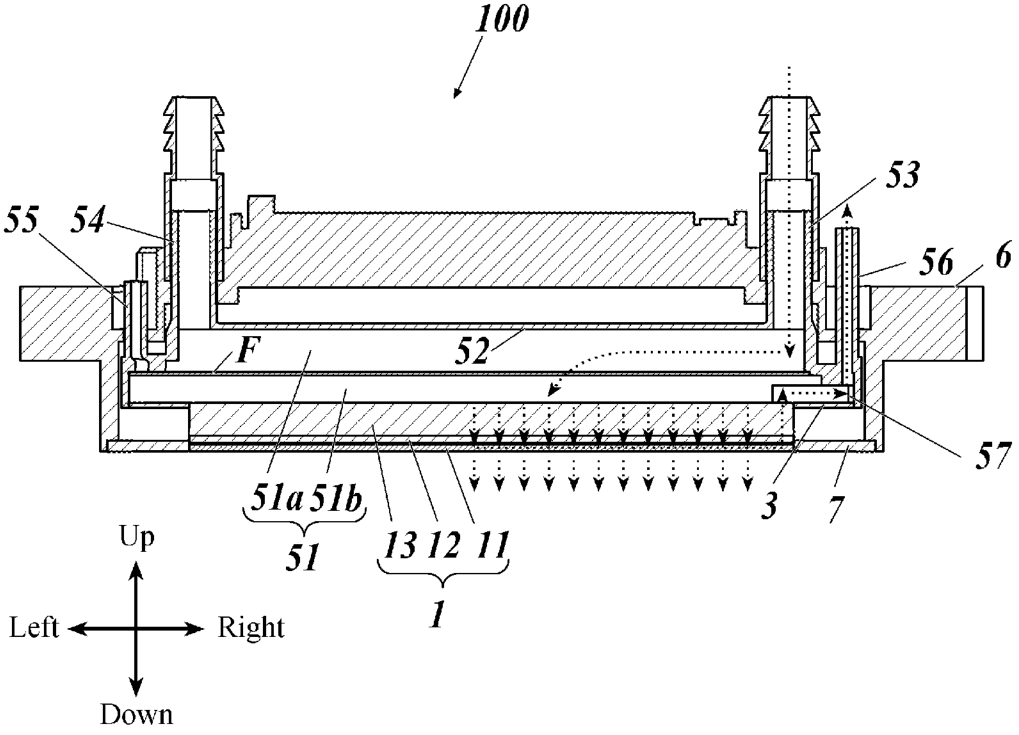
FIG. 7B is a cross-sectional view of an inkjet head.
Figure 8:
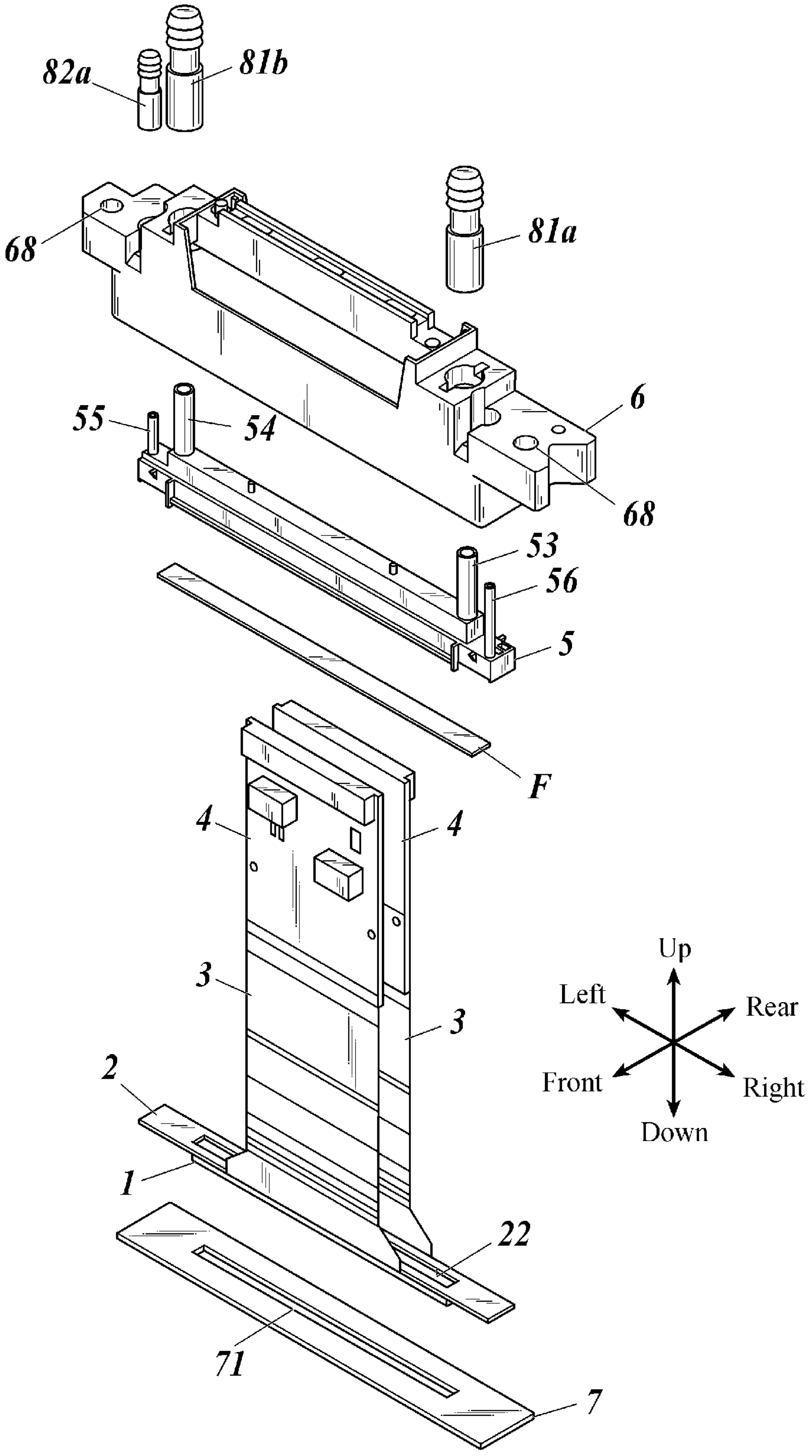
FIG. 8 This is an exploded perspective view of an inkjet head.

As shown in FIG. 7A, FIG. 7B and FIG. 8, the inkjet head 100 of the present embodiment includes a head chip 1, a wiring substrate 2 on which the head chip 1 is arranged, a drive circuit board 4 connected to a wiring board 2 via a flexible board 3, a manifold 5 storing ink to be supplied to the head chip 1, a housing 6 housing the manifold 5 inside, a cap receiving plate 7 attached to close the bottom opening of the housing 6, and a cover member 9 attached to the housing 6. The illustration of the manifold 5 is omitted in FIG. 7A, and the illustration of the cover member 9 is omitted in FIG. 7B and FIG. 8. In this embodiment, an example in which the number of rows of nozzles 111 of the head chip 1 is four will be described, but the number and arrangement of nozzles 111 may be changed as appropriate. Any number of columns may be used, and five or more rows may be used.

The head chip 1 is a member having a substantially quadrangular prism shape elongated in the left-right direction, and is configured by stacking a pressure chamber substrate 13, a channel substrate 12, and a silicon nozzle substrate 11 in this order (FIG. 9 to FIG. 15).

In such a head chip 1, as described above, the channel substrate 12 is the first channel substrate according to the present invention, and the nozzle substrate 13 is the second channel substrate according to the present invention. At least one of the first and the second channel substrates is formed of silicon, and the bonding interfaces of the first and the second channel substrates 12 and 11 are bonded via an adhesive layer 92, and a protective film 91 containing a compound having a Si—C bond is formed on the ink channel surface formed of silicon among the first and the second channel substrates 12 and 11, and on a surface of the channel substrate side in the adhesive layer 92 formed of silicon (see FIG. 1 and FIG. 3).

In FIGS. 7B, 13A, 13B, 14A and 14B, illustrations of the protective film 91, the adhesive layer 93, and the liquid-repellent film 92 are omitted.

Figure 9:
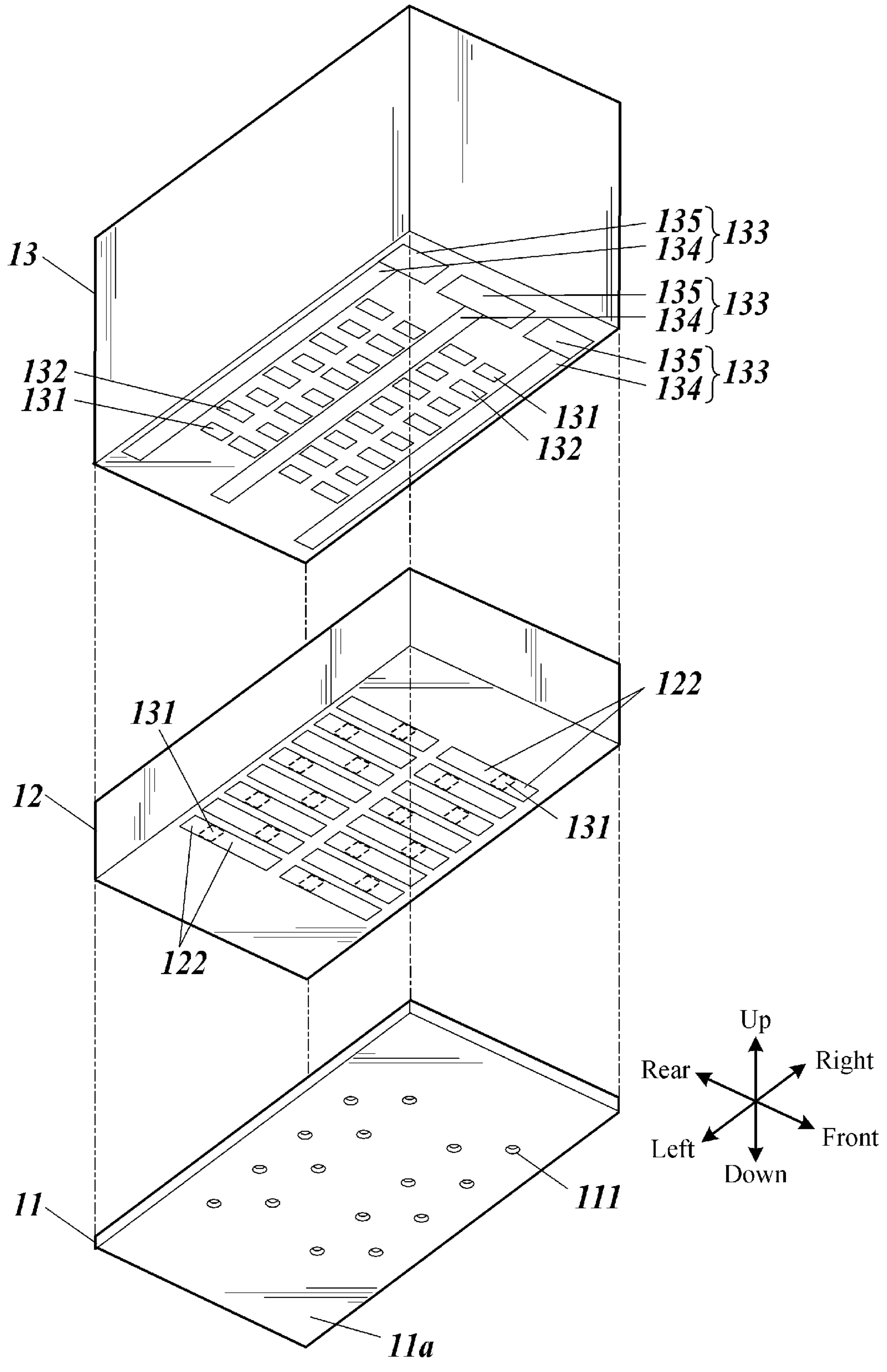
FIG. 9 This is an exploded perspective view of a head chip.
Figure 10A:
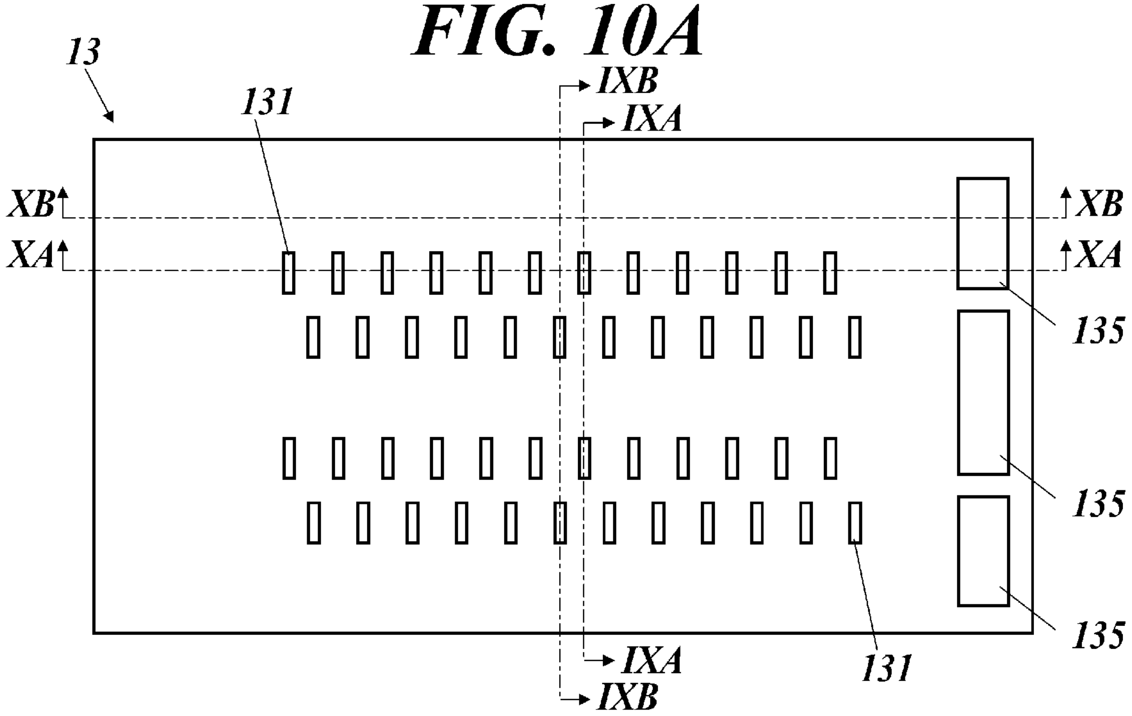
FIG. 10A This is a plan view of a pressure chamber substrate.
Figure 10B:
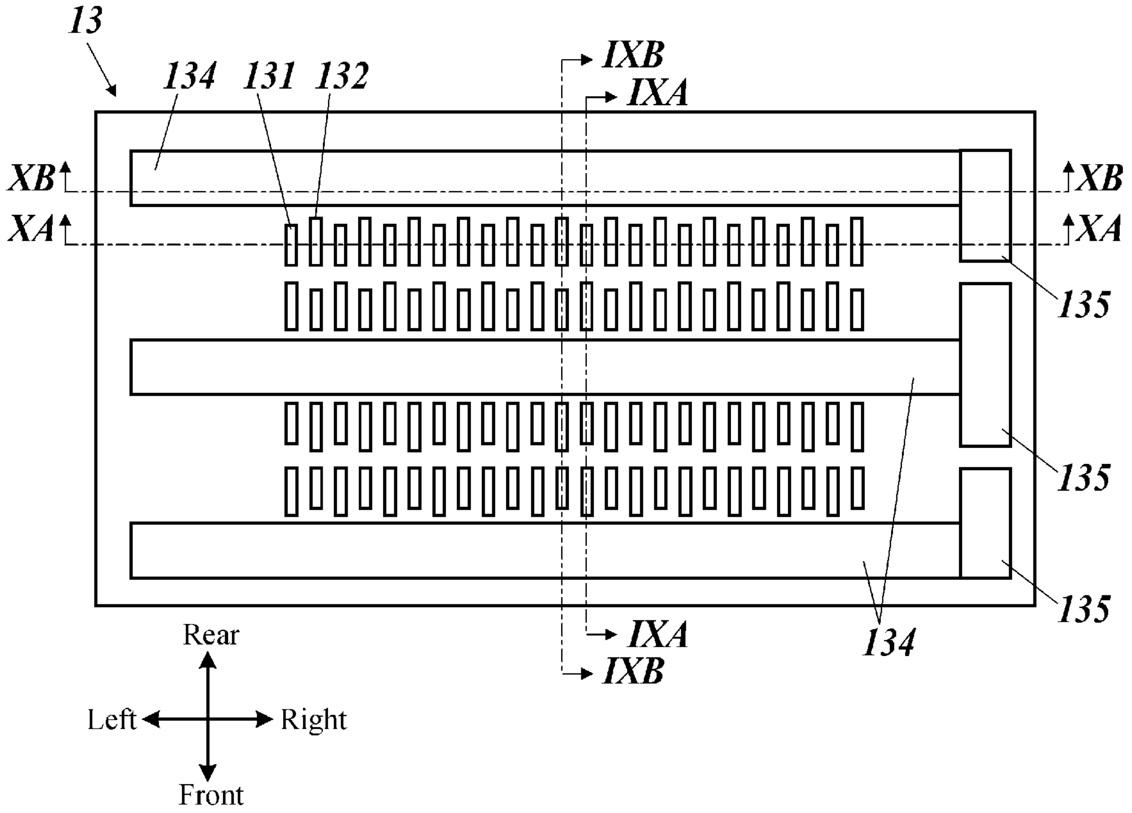
FIG. 10B This is a bottom view of a pressure chamber substrate.
Figure 11A:
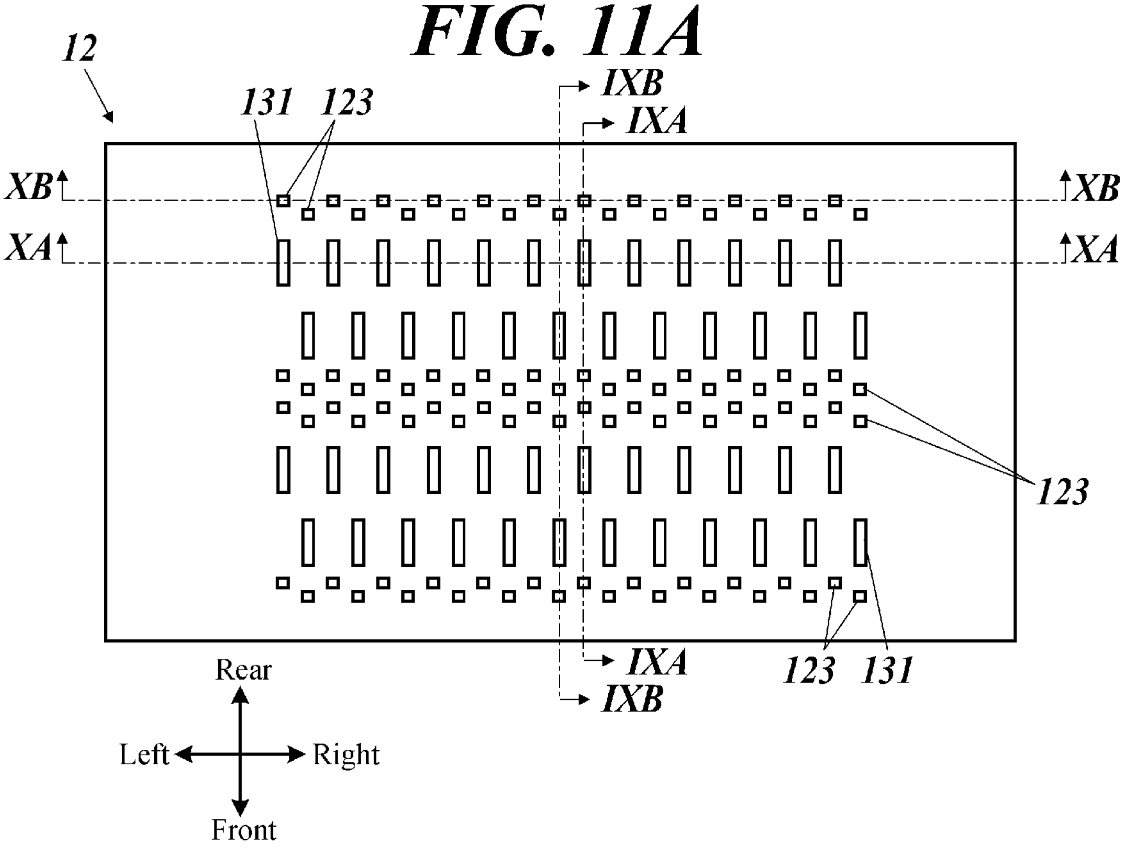
FIG. 11A This is a plan view of a channel substrate.
Figure 11B:
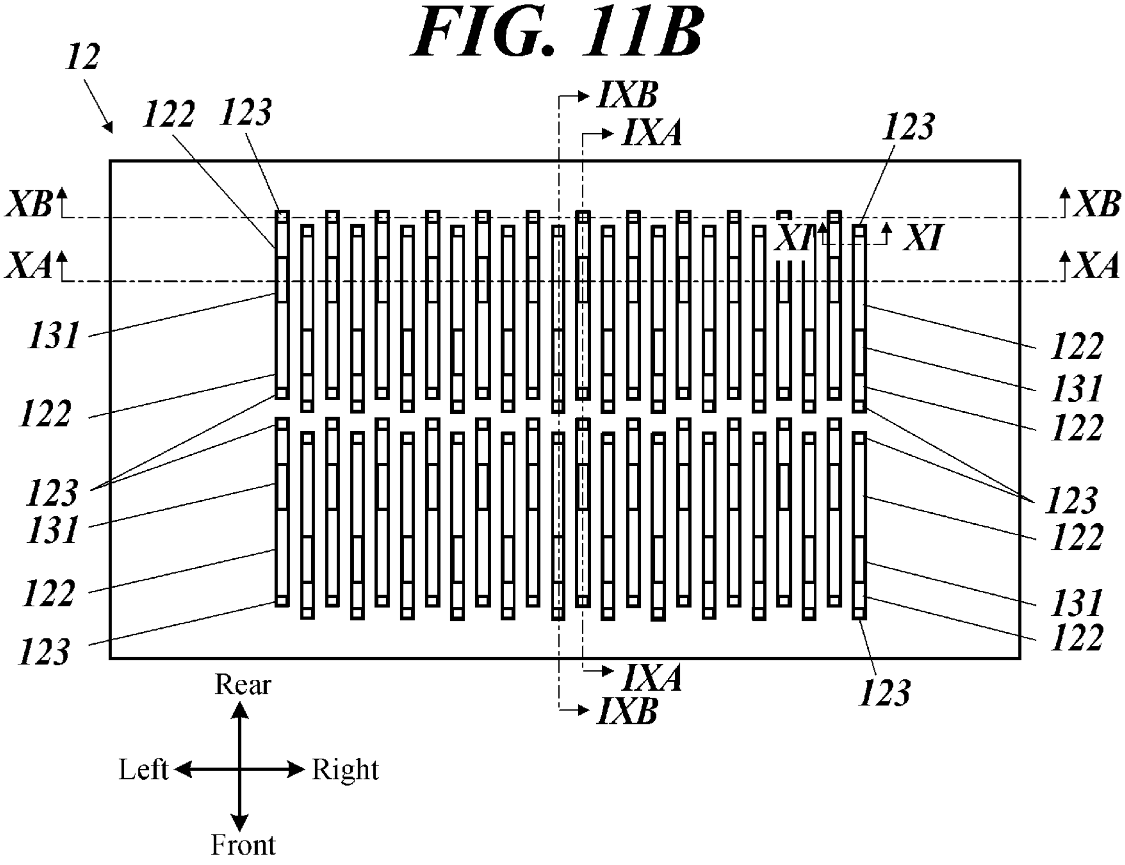
FIG. 11B This is a bottom view of a channel substrate.

The pressure chamber substrate 13 is provided with a pressure chamber 131, an air chamber 132, and a common ink discharge path 133 (see FIG. 9, FIG. 10A, and FIG. 10B). A large number of pressure chambers 131 and air chambers 132 are provided so as to be alternately arranged in the left-right direction, and are provided in four rows in the front-rear direction.

The pressure chamber 131 has a substantially rectangular cross-section and is formed along the up-down direction, and has an inlet on the upper surface of the pressure chamber substrate 13 and an outlet on the lower surface. The pressure chamber 131 communicates with an ink reservoir 51 at its upper end, and the ink is supplied from the ink reservoir 51 to the pressure chamber 131, and the ink to be ejected from the nozzle 111 is stored inside the pressure chamber 131.

Figure 13A:
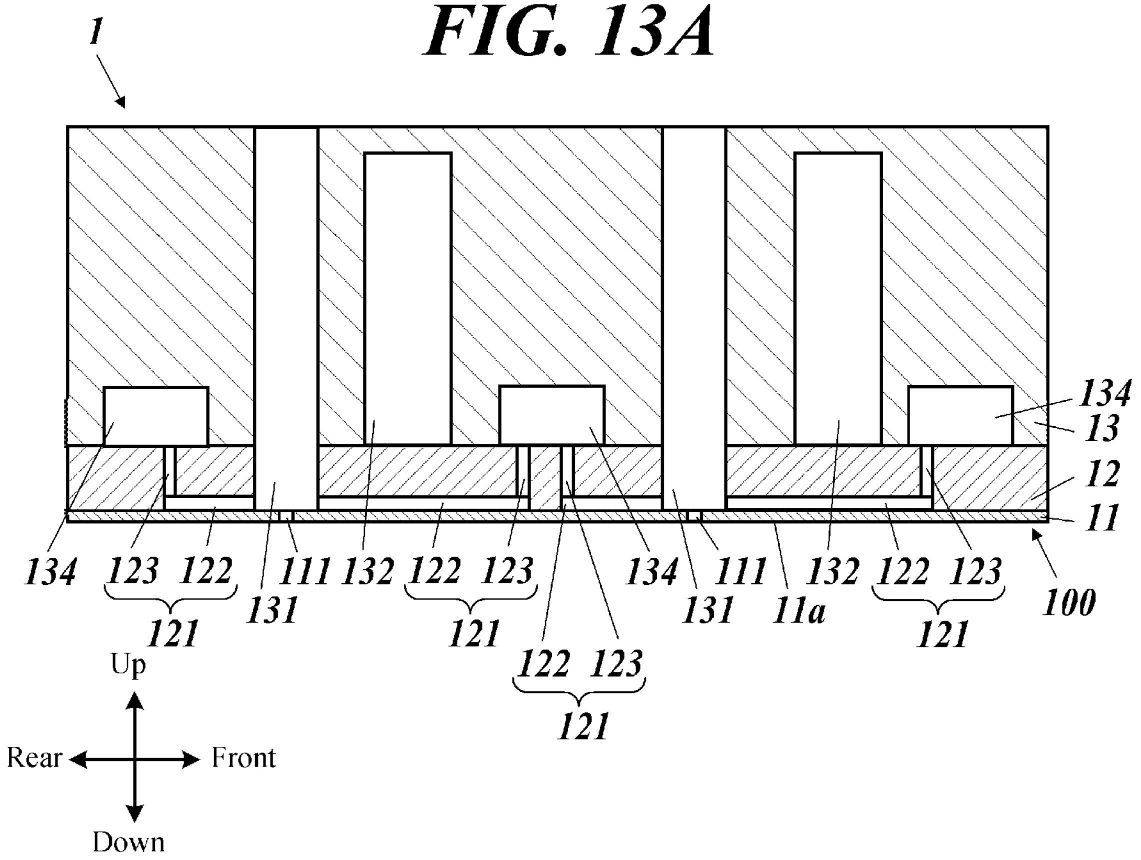
FIG. 13A This is a cross-sectional view of a head chip when cut with IXA-IXA.
Figure 13B:
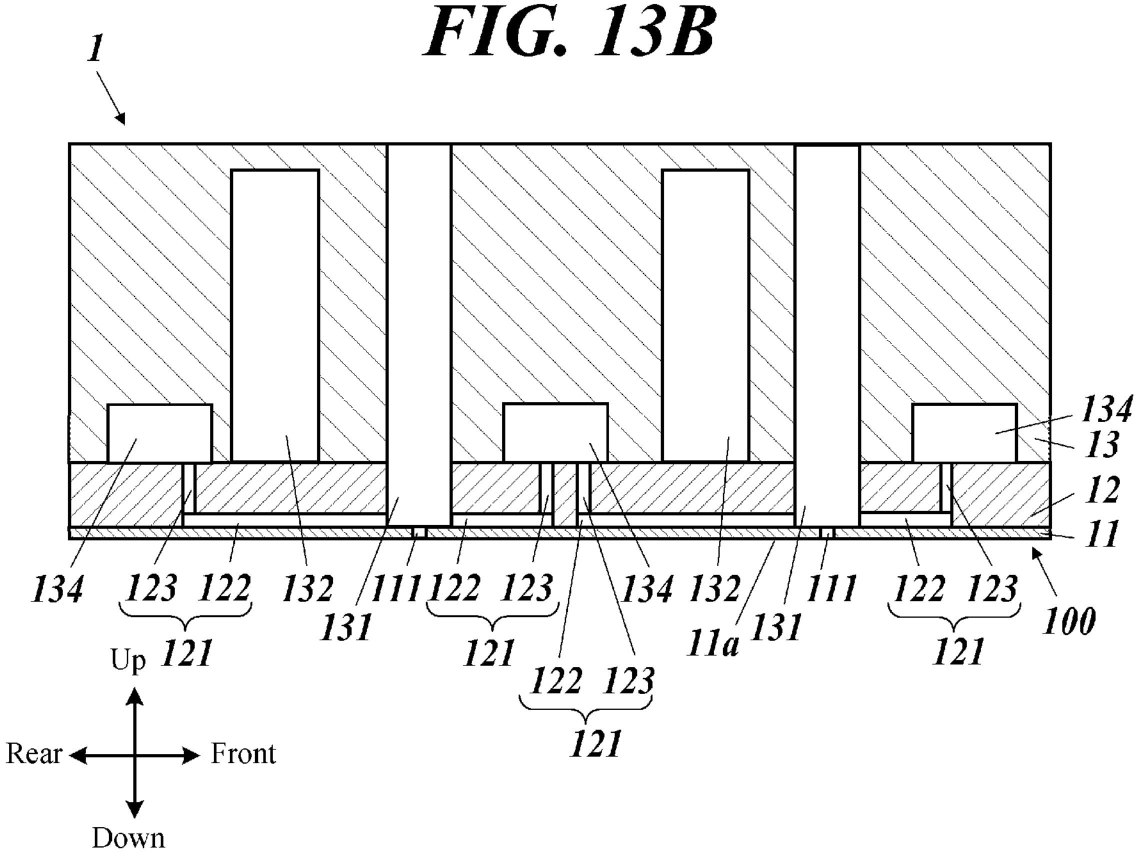
FIG. 13B This is a cross-sectional view of a head chip when cut with IXB-IXB.
Figure 14A:
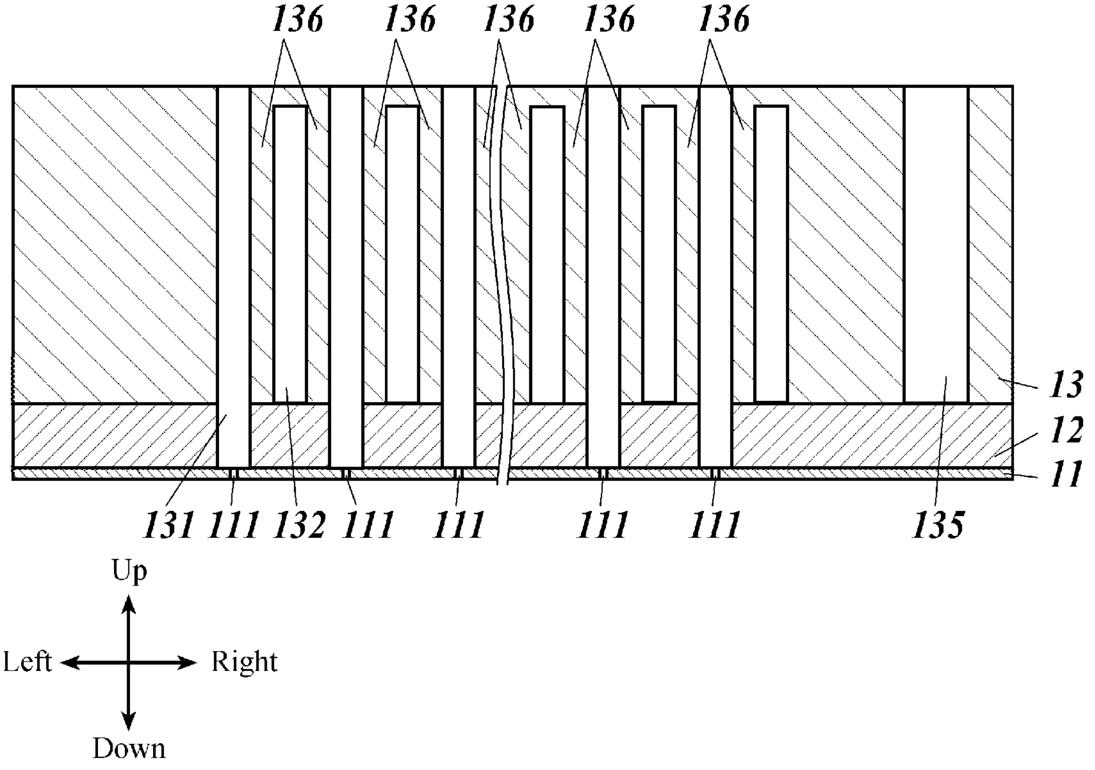
FIG. 14A This is a cross-sectional view of a head chip when cut with XA-XB.
Figure 14B:
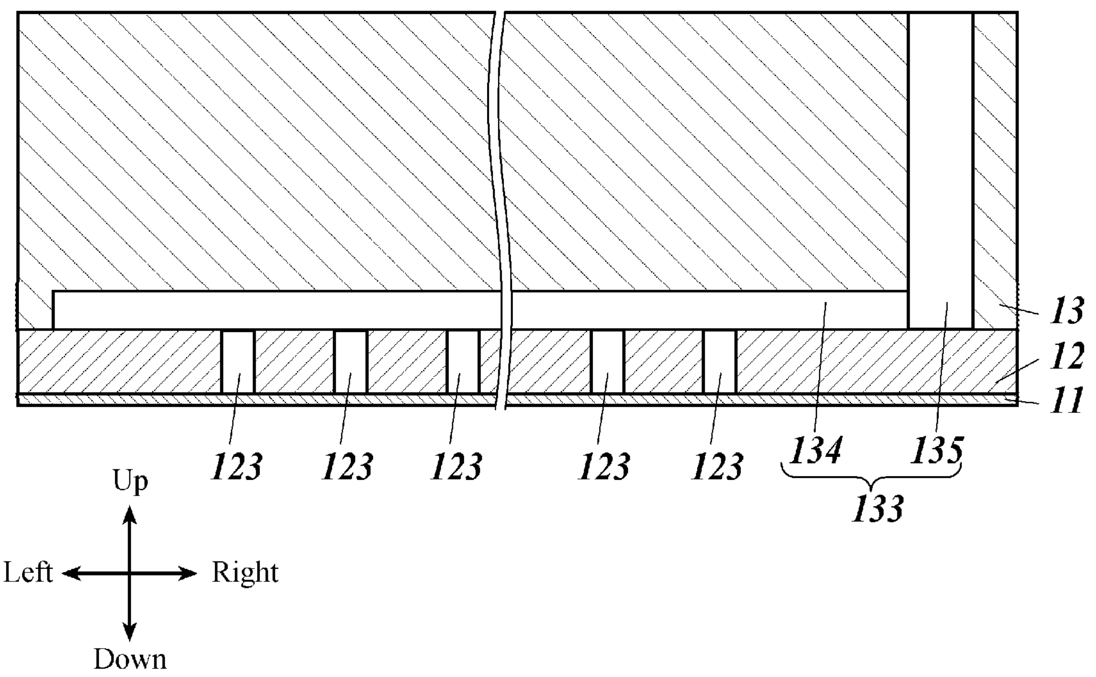
FIG. 14B This is a cross-sectional view of a head chip when cut with XA-XB.

Further, the pressure chamber 131 is formed along the up-down direction so as to have a substantially rectangular cross-section with the same area, straddling the pressure chamber substrate 13 and the channel substrate 12, and communicates with the nozzle 111 at the downward end (see FIGS. 13A, 13B).

The air chamber 132 has a substantially rectangular cross-section slightly larger than the supply channel 131, and is formed so as to be parallel to the supply channel 131 along the up-down direction. Unlike the supply channel 131, the air chamber 132 does not communicate with the ink reservoir 51, and the ink does not flow into the air chamber 132 (refer to FIG. 13A and FIG. 13B).

The supply channel 131 and the air chamber 132 are formed to be separated from each other by a partition wall 136 as a pressure-generating unit formed of a piezoelectric material (see FIG. 18A). The partition wall 136 is provided with drive electrodes (not shown), and when a voltage is applied to the drive electrodes, a portion of the partition wall 136 between the adjacent supply channel 131 repeats shear-mode type displacement, whereby a pressure is applied to the ink in the supply channel 131. In the supply channel 131 shown in FIG. 13 to FIG. 18B, the supply channel 131 located at the end portion in the left-right direction having the partition wall 136 only on one side is not used, and the other supply channel 131 having the partition wall 136 on both sides is used.

It should be noted that only the supply channel 131 may be formed without providing the air chamber 132. However, as described above, it is preferable that the supply channel 131 and the air chamber 132 are alternately provided so that the supply channels 131 are not adjacent to each other. As a result, the supply channels 131 may be prevented from adjoining each other, so that when the partition wall 136 adjacent to one supply channel 131 is deformed, the other supply channels 131 are not affected.

The common ink discharge path 133 is configured by connecting a first common ink discharge path 134 and a second common ink discharge path 135 (see FIG. 9 and FIG. 10B). The first common ink discharge paths 134 are provided in three rows along the left-right direction on the front side, the rear side, and the center of the head chip 1, so as to avoid the portion where the pressure chambers 131 and the air chambers 132 are provided on the lower surface side of the pressure chamber substrate 13. A plurality of individual ink discharge paths 121 provided on the channel substrate 12 are connected to the lower surface side of the first common ink discharge path 134, and these individual ink discharge paths 121 (second individual ink discharge paths 123) are connected. The ink flowing from the nozzles may be merged in the first common ink discharge path 134 (see FIG. 10B, FIG. 11A and FIG. 13A). Also, the first common ink discharge path 134 is connected near the right end to a second common ink discharge path 135 capable of discharging ink to the outside of the head chip 1. Therefore, the first common ink discharge path 134 serves as a flow path through which the ink flowing from the individual ink discharge path 121 (the second individual ink discharge path 123) flows toward the second common ink discharge path 135.

Like the pressure chamber 131, the second common ink discharge path 135 is formed along the up-down direction. The second common ink discharge path 135 communicates with the first common ink discharge path 134 on the lower surface side of the pressure chamber substrate 13, and communicates with the discharge liquid chamber 57 on the upper surface side of the pressure chamber substrate 13. It is a channel for discharging the ink flowing from 134 toward the upper side (the side opposite to the nozzle substrate 11 side) to the outside of the head chip 1. The second common ink discharge path 135 is provided near the right end of the head chip 1 and communicates with the first common ink discharge path 134. Further, by providing the second common ink discharge path 135 so as to have a volume larger than that of the individual pressure chamber 131, the ink discharge efficiency may be enhanced.

A pressure chamber 131 and an individual ink discharge path 121 branched from the pressure chamber 131 are formed in the channel substrate 12 (see FIG. 13A and FIG. 13B). The pressure chamber 131 is formed along the up-down direction so as to straddle the channel substrate 12 and the pressure chamber substrate 13 and have a substantially rectangular cross-section with the same area.

One end of the individual ink discharge path 121 is connected to the pressure chamber 131 and the other end is connected to the first common ink discharge path 134. It serves as a channel for discharging the ink in the pressure chamber 131 to the first common ink discharge path 134.

At least two individual ink discharge paths 121 are preferably provided for each pressure chamber 131 from the viewpoint of facilitating discharge of air bubbles and foreign matter together with the ink. In addition, as shown in FIG. 13A and FIG. 13B, for example, two individual ink discharge paths 121, one each in the forward direction and the rearward direction of the pressure chamber 131, may be provided. It is preferable because the effect of facilitating discharge is obtained and the production efficiency is high.

The channel substrate 12 is preferably formed of silicon, stainless steel (SUS), nickel, or 42 alloy, from the viewpoint that the individual ink discharge path 121 is easy to process (high accuracy), and from the viewpoint that the ink temperature may be easily kept uniform because of its high thermal conductivity. Among these, it is preferable to use a substrate made of a material having a coefficient of thermal expansion close to that of the material forming the pressure chamber substrate 13.

Figure 12:
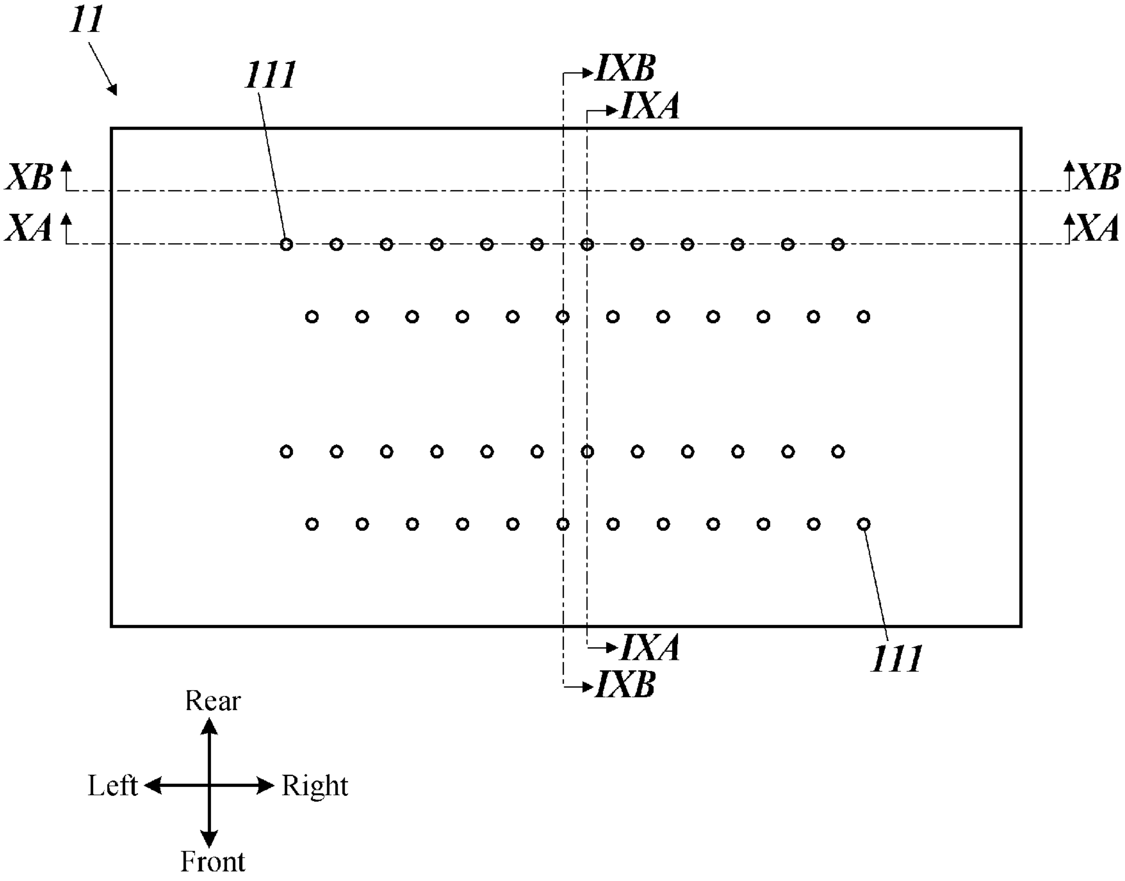
FIG. 12 This is a plan view of a nozzle substrate.

The nozzle substrate 11 is provided with a nozzle 111 which is a hole penetrating in the thickness direction (up-down direction) (see FIG. 12). The nozzle 111 communicates with the pressure chamber 131 and serves as an ejection port for ejecting ink stored in the pressure chamber 131 when pressure is applied to the ink in the pressure chamber 131. Further, the nozzles 111 in this embodiment are arranged in the left-right direction and form four rows in the front-rear direction.

Also, as shown in FIG. 13A and FIG. 13B, the nozzle substrate 11 preferably constitutes one of the channel walls of the first individual ink discharge path 122. In addition, since the nozzle substrate 11 is thin, it may function as a damper capable of changing the volume of the channel by slightly elastically deforming due to pressure.

The nozzle substrate 11 is produced by etching a silicon substrate as described above.

As shown in FIG. 8, a wiring board 2 is arranged on the upper surface of the head chip 1, and two flexible boards 3 connected to a driving circuit board 4 are provided on both edges of the wiring board 2 along the front-rear direction.

The wiring board 2 is formed in a substantially rectangular plate shape elongated in the left-right direction, and has an opening 22 in a substantially central portion thereof. The widths of the wiring board 2 in the left-right direction and the width in the front-rear direction are formed to be larger than those of the head chip 1.

The opening 22 is formed in a substantially rectangular shape elongated in the left-right direction. In the state where the head chip 1 is attached to the wiring substrate 2, the inlet of each pressure chamber 131 and the outlet of the second common ink discharge path 135 in the head chip 1 are exposed upward.

The flexible substrate 3 electrically connects the drive circuit substrate 4 and the electrode portion of the wiring substrate 2, and signals from the drive circuit board 4 may be applied to the drive electrodes provided on the partition wall 136 inside the head chip 1 through the flexible board 3.

Further, the lower end of the manifold 5 is attached and fixed to the outer edge of the wiring board 2 by adhesion. That is, the manifold 5 is arranged on the inlet side (upper side) of the pressure chamber 131 of the head chip 1 and connected to the head chip 1 via the wiring substrate 2.

The manifold 5 is a member molded from resin, is provided above the pressure chamber substrate 13 of the head chip 1, and stores ink supplied to the head chip 1. Specifically, as shown in FIG. 7B, the manifold 5 is elongated in the left-right direction, and is provided with a hollow main body 52 constituting an ink reservoir 51 and a first to a fourth ink ports 53 to 56 constituting ink channels. The ink reservoir 51 is divided into two chambers, a first liquid chamber 51*a* on the upper side and a second liquid chamber 51*b* on the lower side, by a filter F for removing dust in the ink.

The first ink port 53 communicates with the right upper end of the first liquid chamber 51*a* and is used to introduce an ink into the ink reservoir 51. A first joint 81*a* is externally inserted at the tip of the first ink port 53.

The second ink port 54 communicates with the upper left end of the first liquid chamber 51*a* and is used to remove air bubbles in the first liquid chamber 51*a*. A second joint 81*b* is externally fitted to the tip of the second ink port 54.

The third ink port 55 communicates with the upper left end of the second liquid chamber 51*b* and is used to remove air bubbles in the second liquid chamber 51*b*. A third joint 82*a* is externally inserted at the tip of the third ink port 55.

The fourth ink port 56 communicates with a discharge liquid chamber 57 that communicates with the outlet of the second common ink discharge path 135 of the head chip 1, and the ink discharged from the head chip 1 is discharged to the outside of the inkjet head 100 through the fourth ink port 56.

The housing 6 is, for example, a member formed by die casting using aluminum as a material, and is elongated in the left-right direction. The housing 6 is formed so as to accommodate the manifold 5 to which the head chip 1, the wiring substrate 2 and the flexible substrate 3 are attached, and the bottom of the housing 6 is open. Mounting holes 68 for mounting the housing 6 to the main body side of the printer are formed at both ends of the housing 6 in the left-right direction.

The cap receiving plate 7 has a nozzle opening 71 elongated in the left-right direction at its substantially central portion. The nozzle substrate 11 is exposed through the nozzle openings 71 and attached so as to close the bottom opening of the housing 6.

[Ink Circulation System]

The ink circulation system 8 is an ink supply unit for generating a circulation flow of an ink from the pressure chambers 131 in the inkjet head 100 to the individual ink discharge paths 121. The ink circulation system 8 includes a supply sub-tank 81, a circulation sub-tank 82, and a main tank 83 (see FIG. 155).

The supply sub-tank 81 is filled with an ink to be supplied to the ink storage portion 51 of the manifold 5, and is connected to the first ink port 53 by an ink channel 84. The circulation sub-tank 82 is filled with the ink discharged from the discharge liquid chamber 57 of the manifold 5, and is connected to the fourth ink port 56 by an ink channel 85. The supply sub-tank 81 and the circulation sub-tank 82 are provided at different positions in the up-down direction (gravity direction) with respect to the nozzle surface (hereinafter also referred to as a "position reference surface") of the head chip 1. Accordingly, a pressure P1 due to a water head difference between the position reference surface and the supply sub-tank 81 and a pressure P2 due to a water head difference between the position reference surface and the circulation sub-tank 82 are generated. The supply sub-tank 81 and the circulation sub-tank 82 are connected to each other through an ink channel 86, and the pressure applied by the pump 88 may return the ink from the circulation sub-tank 82 to the supply sub-tank 81.

The main tank 83 is filled with an ink to be supplied to the supply sub-tank 81, and is connected to the supply sub-tank 81 by an ink channel 87. The ink may be supplied from the main tank 83 to the supply sub-tank 81 by the pressure applied by the pump 89.

In addition, it is possible to adjust the pressures P1 and P2 by appropriately changing the amount of the ink filled in each sub-tank and the position of each sub-tank in the up-down direction (gravity direction), and it is possible to circulate the ink in the inkjet head 100 at an appropriate circulating flow rate by the difference between the pressures P1 and P2. Accordingly, it is possible to remove bubbles and foreign matter generated in the head chip 1 and to suppress clogging of the nozzle 111 and ejection failure.

As an example of the ink circulation system 8, a method of controlling the circulation of the ink by the water head difference has been described. However, as long as the configuration is capable of generating a circulating flow of ink, it is naturally possible to change the configuration as appropriate.

In the above description, a share-mode type inkjet head is used, but for example, a bend-mode type inkjet head may be used.

Furthermore, although the first channel substrate and the second channel substrate according to the present invention are applied to the channel substrate 12 and the nozzle substrate 11, respectively, the present invention is not limited to this. For example, the first channel substrate may be applied to the pressure chamber substrate 13, and the second channel substrate may be applied to the channel substrate 12. As a result, the elution of silicon at the ink channel surface of the pressure chamber substrate 13 and the channel substrate 12, and at the bonding interface between the channel substrates 13 and 12 to be bonded is prevented, and ink leakage from the bonding interface to the outside of the channel may be suppressed.

EXAMPLES

Hereinafter, the present invention will be specifically described with reference to examples, but the present invention is not limited to these. In the following examples, unless otherwise specified, operations were performed at room temperature (25° C.). Moreover, unless otherwise specified, "%" and "parts" mean "mass %" and "parts by mass", respectively.

(1) Example 1

[Preparation of Sample 1]

A protective film made of SiC with a thickness of 108 nm was formed on a substrate made of single crystal Si (silicon) by CVD under the following film formation conditions.

(Film Forming Conditions)

Device name: Samco PD-220NL

Raw material gas: Tetramethylsilane (TMS)

Supplied amount of raw material gas: 30 sccm (Standard Cubic Centimeter per Minute)

Applied power from plasma generation power supply: 500 W

Film forming temperature: Room temperature

[Preparation of Sample 2]

Device name: DD-853V manufactured by KOKUSAI ELECTRIC Corporation (former Hitachi Kokusai Electric)

Raw material gas: $O_2$, $H_2$

Method: Pyrogenic oxidation or dry oxidation

Film forming temperature: 900° C. (for pyrogenic)

Oxidation time: 9 minutes (for pyrogenic)

Oxide film thickness: 37 nm

[Preparation of Sample 3]

Device name: Samco PD-220NL

Raw material gas: Tetraethoxysilane

Supplied amount of raw material gas: 3 sccm (Standard Cubic Centimeter per Minute)

Supplied amount of carrier gas: 100 sccm

Applied power from plasma generation power supply: 600 W

Film forming temperature: Room temperature

[Preparation of Sample 4]

Device name: DJ-833V manufactured by KOKUSAI ELECTRIC Corporation (former Hitachi Kokusai Electric)

Raw material gas: Tetrachlorotantalum ($TaCl_4$), silicon tetrachloride ($SiCl_4$)

Oxidizing gas: $H_2O$

Film forming temperature: 200° C.

Film thickness: 48 nm

The chemical composition ratio of the protective film of each sample produced was measured by the XPS composition analysis shown below, and the results are shown in Table I below.

(XPS Composition Analysis)

Device name: X-ray photoelectron spectrometer (XPS)

Device model: Quantera SXM

Equipment manufacturer: ULVAC-PHI

Measurement conditions: X-ray source=Monochromatic Al Kα ray 25 W-15 kV

Degree of vacuum: $5.0\times10^{-8}$ Pa

For data processing, MultiPak manufactured by ULVAC-PHI is used.

[Evaluation]

<KOH Immersion Test>

A KOH aqueous solution with a potassium hydroxide concentration of 40% was heated to 80° C., and each sample prepared above was immersed in a hot water bath of the KOH aqueous solution. Using a film thickness gauge (Optical Nano Gauge C1256 (manufactured by Hamamatsu Photonics K.K.)), the film thickness of the protective film was measured before and after immersion, and the change in film thickness (elution rate [nm/min]) was calculated.

<Water-based Ink Immersion Test>

As a soluble dye ink, a genuine ink (reactive dye) for the inkjet textile printer "Nassenger" (manufactured by Konica Minolta Inc.) was prepared and heated to 60° C. 100 cc of the dye ink and each sample prepared above were enclosed in a test bottle and stored in a baking oven.

Using a film thickness gauge (Optical Nano Gauge C1256 (manufactured by Hamamatsu Photonics K.K.)), the film thickness of the protective film was measured before and after immersion, and the change in film thickness was calculated. In addition, the change in color of the film surface of the protective film was observed. The storage period in the baking furnace was 1 week and 4 weeks, and evaluation was made according to the following criteria.

(Criteria)

Circle: No change in film thickness and no color change on the film surface are observed.

Cross mark: Change in film thickness and color change on the film surface are observed.

TABLE I

| Sample No. | Substrate Material | Protective film Material | Film forming method | Film Thickness [nm] | Chemical composition ratio [atomic %] Si | C | O | Other | XPS Binding energy peak [eV] |
|---|---|---|---|---|---|---|---|---|---|
| 1 | Si | SiCO | CVD | 108 | 15.3 | 65.2 | 19.5 | — | 100.4 |
| 2 | Si | $SiO_2$ | Thermal oxidation | 37 | 33.3 | 66.6 | — | — | 103.5 |
| 3 | Si | SiOC | CVD | 320 | 17.3 | 44.5 | 38.2 | — | 102.3 |
| 4 | Si | Si, O, Transition metal complex | CVD | 48 | 16.3 | 1.5 | 62.5 | 19.7(Ta) | 102.1 |

| Sample No. | KOH Immersion test Elution rate at 60° C. [nm/min] | Water-based ink immersion test 60° C. for 1 hour | 60° C. for 4 hours | Remarks |
|---|---|---|---|---|
| 1 | <0.01 | o | o | Present Invention |
| 2 | 4.6 | x | x | Comparative Example |
| 3 | 0.1 | o | x | Comparative Example |
| 4 | 1.67 | o | x | Comparative Example |

As shown in the above results, the sample of Si substrate on which the SiCO protective film of the present invention is formed had an elution rate below the detection limit in the KOH immersion test compared to the sample of the comparative example. In addition, no change in film thickness and no change in color of the film surface were observed in the water-based ink immersion test. Therefore, it can be seen that silicon elution can be prevented by forming the aforementioned SiCO protective film. The fact that silicon elution can be prevented in this way also indicates that when the SiCO protective film is formed on the ink channel surface and the bonding interface, the elution of silicon on the ink channel surface and the bonding interface can be prevented, and leakage of the ink to the outside of the channel at the bonding interface can be suppressed.

INDUSTRIAL APPLICABILITY

The present invention may be used for an inkjet head and a method for manufacturing an inkjet head that can prevent the elution of silicon on the ink channel surface and the bonding interface between the channel substrates to be joined, and suppress the leakage of the ink from the bonding interface to the outside of the channel.

REFERENCE SIGNS LIST

1: Head tip
8: Ink circulation System
11: Nozzle substrate (second channel substrate)
11*a*: Nozzle opening surface
11*b*: Ink channel surface
11*c*: Ink channel surface
11*d*: Bonding interface
111: Nozzle
12: Channel substrate (first channel substrate)
12*b*: Ink channel surface
12*d*: Bonding interface
12*e*: Ink channel surface
12*f*: Ink channel surface
121: Individual ink discharge path
122: First individual ink discharge path
123: Second individual ink discharge path
13: Pressure chamber substrate
131: Pressure chamber
132: Air chamber
133: Common ink discharge path
134: First common ink discharge path
135: Second common ink discharge path
136: Partition wall
91: Protective film

92: Liquid-repellent film
93: Adhesive layer
100: Inkjet head
200: Inkjet recording apparatus
300: SOI substrate
301: Active layer
302: Etching stopper layer
303: Support layer
304: Temporary fixing substrate

The invention claimed is:

1. An inkjet head comprising a first and a second channel substrates, wherein at least one of the first and the second channel substrates is formed of silicon;

a bonding interface of the first and the second channel substrates is bonded via an adhesive layer;

a protective film containing a compound having a Si—C bond is formed on: an ink channel surface formed of silicon among the first and the second channel substrates; and a surface of the channel substrate side formed of silicon in the adhesive layer; and the protective film has a maximum peak in an energy band (99.9 to 100.9 eV) derived from a Si—C bond detected by X-ray photoelectron spectroscopy.

2. The inkjet head according to claim 1, wherein the at least one of the first and the second channel substrates is a substrate formed of silicon and containing a nozzle;

the protective film containing the compound having the Si—C bond is formed on: the ink channel surface formed of silicon of the substrate containing the nozzle; and the surface of the channel substrate side formed of silicon in the adhesive layer;

the protective film is further formed on a nozzle opening surface of the substrate including the nozzle; and a liquid-repellent film containing a fluorine-based compound having a siloxane bond is formed on the protective film on the nozzle opening surface.

3. The inkjet head according to claim 1, wherein both the first and the second channel substrates are formed of silicon.

4. The inkjet head according to claim 3, wherein the both the first and the second channel substrates are formed of silicon, and the at least one of the first and the second channel substrates is a substrate containing a nozzle;

the protective film containing the compound having the Si—C bond is formed on: the ink channel surface formed of silicon of the substrate containing the nozzle; and the surface of the channel substrate side formed of silicon in the adhesive layer;

the protective film is further formed on a nozzle opening surface of the substrate including the nozzle; and a liquid-repellent film containing a fluorine-based compound having a siloxane bond is formed on the protective film on the nozzle opening surface.

5. The inkjet head according to claim 1, wherein a surface layer of the protective film formed at the bonding interface is oxidized; and the adhesive layer contains a silane coupling agent.

6. A method for producing the inkjet head according to claim 1, comprising the steps of:

forming a protective film containing a compound having a Si—C bond on: an ink channel surface formed of silicon among the first and the second channel substrates; and a surface of the channel substrate side formed of silicon in the adhesive layer; and bonding a bonding interface of the first and the second channel substrates via an adhesive layer, wherein the protective film has a maximum peak in an energy band (99.9 to 100.9 eV) derived from a Si—C bond detected by X-ray photoelectron spectroscopy.

* * * * *